United States Patent [19]
Motoyama

[11] Patent Number: 5,848,386
[45] Date of Patent: Dec. 8, 1998

[54] METHOD AND SYSTEM FOR TRANSLATING DOCUMENTS USING DIFFERENT TRANSLATION RESOURCES FOR DIFFERENT PORTIONS OF THE DOCUMENTS

[75] Inventor: Tetsuro Motoyama, Sata Clara, Calif.

[73] Assignees: Ricoh Company, Ltd., Tokyo, Japan; Ricoh Corporation, San Jose, Calif.

[21] Appl. No.: 654,207

[22] Filed: May 28, 1996

[51] Int. Cl.$^6$ .................................................. G06F 17/28
[52] U.S. Cl. ................................................ 704/5; 707/513
[58] Field of Search .................. 704/1, 2, 5, 3, 704/10; 364/920.4; 707/513, 532

[56] References Cited

U.S. PATENT DOCUMENTS

| | | | |
|---|---|---|---|
| 4,553,261 | 11/1985 | Froessl | 382/306 |
| 4,584,667 | 4/1986 | Hashimoto et al. | 704/7 |
| 4,890,230 | 12/1989 | Tanoshima et al. | 704/3 |
| 4,916,614 | 4/1990 | Kaji et al. | 704/2 |
| 4,980,289 | 12/1990 | Okajima et al. | 704/2 |
| 5,029,114 | 7/1991 | Makiguchi | 345/439 |
| 5,062,047 | 10/1991 | Tanaka et al. | 704/3 |
| 5,091,876 | 2/1992 | Kumano | 704/2 |
| 5,109,439 | 4/1992 | Froessl | 364/963.1 |
| 5,132,901 | 7/1992 | Yokogawa | 704/2 |
| 5,140,522 | 8/1992 | Ito et al. | 704/2 |
| 5,329,446 | 7/1994 | Kugimiya et al. | 704/4 |
| 5,466,072 | 11/1995 | McCready | 707/534 |
| 5,497,319 | 3/1996 | Chong et al. | 704/2 |
| 5,535,120 | 7/1996 | Chong et al. | 704/3 |
| 5,548,508 | 8/1996 | Nagami | 704/2 |
| 5,587,902 | 12/1996 | Kugimiya | 704/2 |

OTHER PUBLICATIONS

English Language Abstracts of Japanese Published Patent Application 4–77965 Mar. 12, 1992.

*Primary Examiner*—David R. Hudspeth
*Assistant Examiner*—Patrick N. Edouard
*Attorney, Agent, or Firm*—Oblon, Spivak, McClelland, Maier & Neustadt, P.C.

[57] ABSTRACT

A system and method for translating a document from one language to another language using different translation resources depending on the document or portion of the document being translated. The original document which is to be translated contains information indicating the dictionary or translation rules which are to be utilized for the translation. The information contained within the document used to indicate different sections is encoded using Standard Generalized Markup Language (SGML) tags. Documents which have been previously translated can be used to train the translation system. Also, a side-by-side display of the original document and the translated document is presented to allow the user to compare both the original and translated document.

26 Claims, 18 Drawing Sheets

```
1    <!DOCTYPE OURDOC PUBLIC "----">

2    <OURDOC>

3        <LANG> English

4        <DIVISION> XYZ

5        <DEVTYPE> Scanner

6        <TYPE> Product Specification

7        <TITLE> RS2200-EF

8        <OVERVIEW>

9            <DEVICE> <p> This Scanner....

10           <FIG ID="Machine 1">

11           <FEATURE>

12               <LI>

13                   <IT> Small sheet scanner...

14                   <IT> Scans both sides

15                   <IT> Scans up to B5
```

*FIG. 2*

METHOD AND SYSTEM FOR TRANSLATING DOCUMENTS USING DIFFERENT TRANSLATION RESOURCES FOR DIFFERENT PORTIONS OF THE DOCUMENTS

BACKGROUND OF THE INVENTION

1. Field of the Invention

This invention relates to the machine translation of documents using resources such as dictionaries and rule data bases. The invention is further related to using different dictionaries and data bases for translating different parts of a document. The invention is still further related to creating the document to be translated using tags such as Standard Generalized Markup Language (SGML) to indicate different sections of the document which are to use different translation resources.

2. Discussion of the Background

The concept of machine translation which translates a document from one human language to another has been widely studied. In the infancy of machine translation in the early 1940s, Warren Weaver of the Rockerfeller Foundation considered the concept of translation to be analogous to decoding in a manner using one-for-one substitution. However, it was soon realized that this was an overly simplistic analogy and that the subtleties of human language had to be taken into account in developing translation systems. For instance, the meaning of certain words in context has to be determined since specific phrases may have meanings that are not apparent from the individual words and some words have different meanings in different contexts.

One approach to improving the machine translation of a document is to impose restrictive rules on the words and phrases contained in the source document which is to be translated. In such a manner, one can obtain perfect translations but at the cost of radically restricting what an author can say. The basic idea of limiting the language which can be used in the source document which is to be translated is similar to the use of a translation phrase book often used by tourists which provides the user with a collection of "canned" phrases to use. This is fine, provided the canned text contains what the user wants to say. However, this is not convenient in many instances.

SUMMARY OF THE INVENTION

Accordingly, it is an object of the invention to provide a machine translation system and method which provides a more accurate translation than conventional machine translation systems but is not overly restrictive of the words or phrases which are contained in the source document. It is another object of the invention to provide a machine translation system and method that uses different translation resources such as dictionaries and rule data bases for different parts of a document to produce more accurate translations and minimize post-translation editing. It is a further object of the invention to utilize tags such as SGML tags to define the structure of the document to be translated in order to select the dictionaries and/or rules which are to be used for the translation process.

It is yet another object of the invention to provide an interactive translation system which allows a user to display both the source document and the machine translated document side-by-side which allows the user to interactively change the translated document to have a more preferable translation. It is still another object of the invention to update dictionaries and/or translation rules based on the changes which the user has made to the automatic translation.

These and other objects are accomplished by a method, system, and computer program product which translate, with the assistance of a machine such as a computer, a document from one human language to another. The present invention utilizes different translation resources or translation information such as dictionaries or translation rules for different sections of the document. The sections of the document are indicated through the use of tags which indicate portions or sections of documents. The tags are preferably tags which are created in accordance with the Standard Generalized Markup Language (SGML).

Before any translation can be performed, a Document Type Definition (DTD) must be created which defines the permissible tags and the permissible structure of a document. The DTD defines the permissible structure and hierarchy of a document. For example, a document which describes a device such as a scanner might have major sections such as an overview, a description of the hardware of the scanner, a description of the software utilized with the scanner, and accessories or options which can be used with the scanner. The overview section might include the name or description of the device, a figure showing the scanner, and a list of features of the scanner.

After the Document Type Definition has been established, the dictionary and rule data bases which are to be used with the translation process must be defined. One manner of creating the dictionaries and rules used for the translation of the different sections of the document is to input documents having a known translation. In this manner, the system can automatically build the dictionary and translation rules so that the translation of the document results in the proper known translation. In addition to or alternative to the translation of known documents, the user can manually translate a document so that dictionaries and rules are built based on the input of a user. Further, a combination of automatic and manual translation can be performed which allows the user to correct the translations performed automatically so that the resulting translation is more accurate. As a further alternative, the rules and dictionaries are manually created.

The preferred operation of the invention utilizes a separate data structure for each of the different sections of the document. The data structure stores information indicating information such as names and locations of further dictionaries and rules which may be utilized with the corresponding section or other sections of the document. The use of the data structure to keep track of the dictionaries and rules permits the different dictionaries and rules to be arranged in a hierarchy similar to a hierarchy of the structure of the document.

When the translation system is sufficiently developed and trained, the translation process can become automatic, using the specific dictionary information and translation rules which correspond to a specific section of the document. By using the specific dictionary information and rules for the different sections of the document, the translation becomes more accurate and becomes closer to a one-to-one correspondence between the source document and translated document without the burdens or difficulties which arise from using translation systems which are limited to the use of canned phrases.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 2 illustrates the encoding of a portion of a document using SGML tags;

DESCRIPTION OF THE PREFERRED EMBODIMENTS

Figure 1:
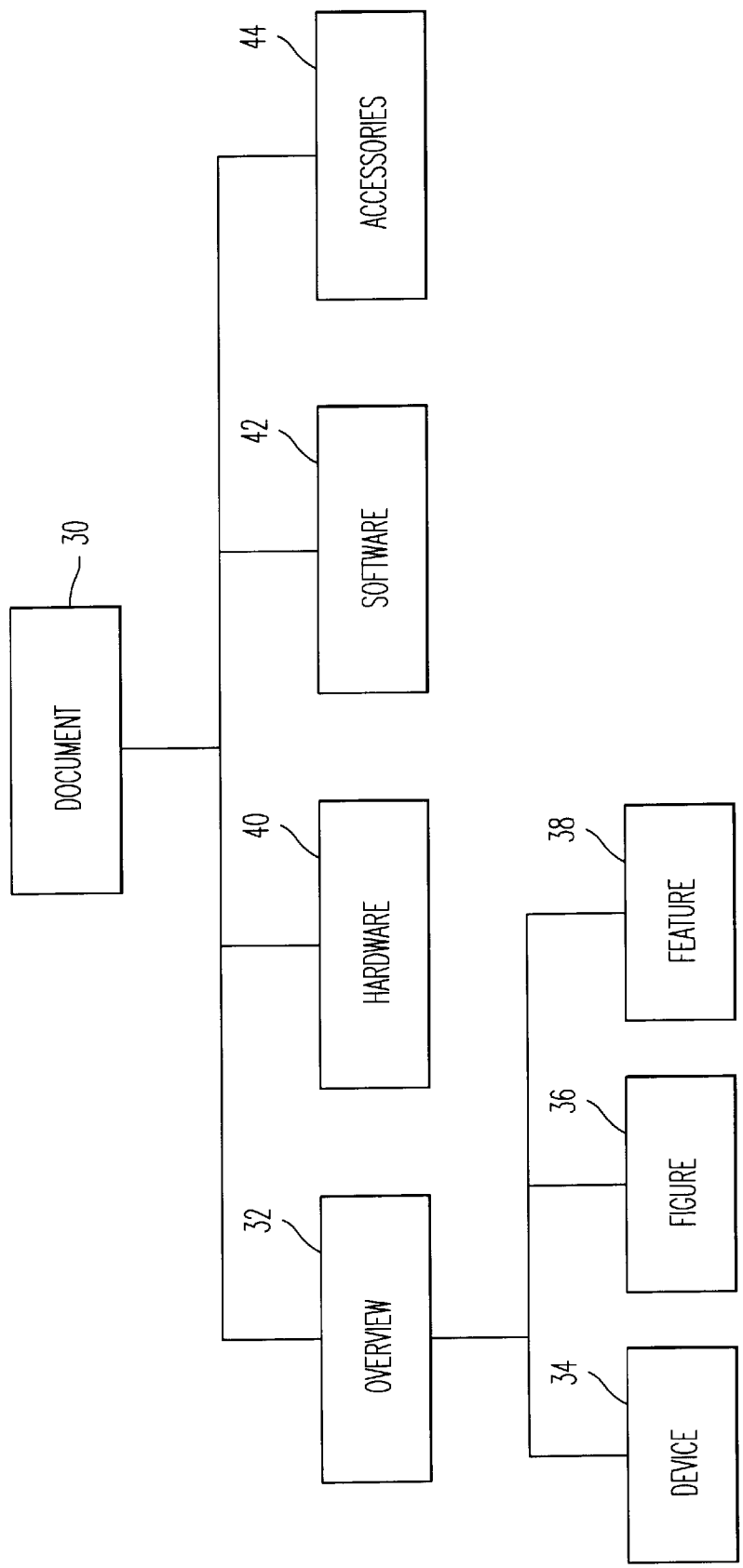
FIG. 1 illustrates the hierarchical structure of an exemplary document.

Referring now to the drawings, wherein like reference numerals designate identical or corresponding parts throughout the several views, and more particularly to FIG. 1 thereof, the structure of an exemplary document which is to be translated is illustrated. The structure of the document illustrated in FIG. 1 can be used for devices such as a copier, facsimile machine, printer, scanner, or other devices. The document 30 consists of four major sections including an overview 32 of the device described in the document, a description of the hardware 40 utilized by the device, a description of the software 42 utilized by the device, and a section describing the accessories or options 44 of the device. Each of the sections may include sub-sections, as desired which further divide the document into more detailed sections. For example, the overview section 32 contains a device section 34 which includes a paragraph description of the device, a FIG. 36 which contains an illustration of a location of where an illustration of the device can be found, and a list of features 38 of the device.

The present invention does not translate the information contained in a figure, although it is possible to substitute a different figure in the translated document which contains an image which is more appropriate to the language into which the document has been translated. For example, a figure of an automobile which is to be used in the United States will show a name which is to be used in the United States whereas the corresponding picture used in a Japanese document will show the name which is to be used in Japan. Also, figures which contain text in a different language can also be used.

Before explaining how the document having the different structural sections illustrated in FIG. 1 is translated, an example of a source document which is to be translated will be described with respect to FIG. 2. In FIG. 2, there is illustrated the structure and content of a portion of a document to be translated. The document has been encoded using tags such as tags which are created in accordance with the Standard Generalized Markup Language (SGML) which is a known manner of encoding and described in detail in the international standard ISO 8879:1986 entitled Standard Generalized Markup Language (SGML), and in the book "The SGML Handbook", by C. F. Goldfarb, from Oxford: Clarendon Press, 1990, both of which are incorporated by reference. However, the invention is not limited to the use of just SGML tags but other formatting such as tags created in accordance with the Hyper Text Markup Language (HTML) or any other manner or encoding a document or marking a document to indicate different structural sections which are to use different translation resources may be utilized by the translation system. A document system using forms can utilize the present invention by having each section of a form treated as an equivalent to a tagged element. According to SGML, tags usually begin with a less than sign (<) are followed by the name of the tag, and end with a greater than sign (>). Each of the elements in FIG. 2 which begin with a less than sign and end with a greater than sign are tags. The tag may be followed by data which describes the tag. For example, the tag <LANG> at line 3 of FIG. 2 is followed by the word "English" which indicates that the document is in the English language.

Tags either are followed by an end tag after the data describing the tag, if any, or do not have an express end tag but implicitly end by the beginning of a subsequent tag. The omission of a tag is allowed only when the syntax of the document structure defined in the DTD is unambiguous and permits a tag omission. An end tag begins with the less than sign followed by a slash which proceeds from the lower left to the upper right, are followed by the name of the tag, and end with a greater than sign (</. . .>). The implicit end to a tag is seen throughout FIG. 2. An example is at lines 3 and 4 where the tag <LANG> is followed by the data "English" which indicates that the document is in the English language. There is no express end tag for the <LANG> start tag but line 4 begins with a new tag <DIVISION> which is used to indicate the division of a company from which a document originates. The occurrence of the <DIVISION> implicitly indicates that the tag <LANG> has ended.

Line 1 of FIG. 2 begins with a description of the !DOCTYPE of the document. The !DOCTYPE declares a previously defined document type definition (DTD) to which the document to be translated conforms. OURDOC in line 1 is the generic identifier of the document element. The information between quotation marks indicates to the SGML parser the location of the DTD. This is standard SGML syntax used to indicate the document type. Line 2 of FIG. 2 is a tag indicating the beginning of the document, line 3 indicates the language of the document is English, and line 4 indicates the document originated from the XYZ division of a company. The present invention can be very useful to international companies which have a need to translate documents of a specific format on regular basis. If desired, the document can indicate not only the division from which the document originated or from which the product originated but also the document can include identifying information of the company.

Line 5 of FIG. 2 indicates that the type of device being described is a scanner. This is useful in narrowing the domain of dictionaries and translation rule data bases which are used to translate the document to dictionaries and translation rules which are used with scanners. Line 6 indicates that the document is a product specification, and that the name or model number of the scanner which is also the title of the document is the RS2200-EF.

Line 8 indicates the beginning of the overview section of the document which is illustrated as 32 in the hierarchical structure illustrated in FIG. 1. The overview section begins with a description of the device at line 10 which is a paragraph (<P>) which begins with the language "This scanner. . . ." Line 10 indicates a figure is next contained in the document and corresponds to the FIG. 36 in the structure of FIG. 1. Next, line 11 indicates that the features of the device are to follow, line 12 indicates that the features are listed, and the items of the list (<IT>) are subsequently listed in lines 13, 14 and 15. The document may further continue but the details thereof are not important and omitted for brevity and in order not to confuse the reader by presenting an overly specific example.

Figure 3:
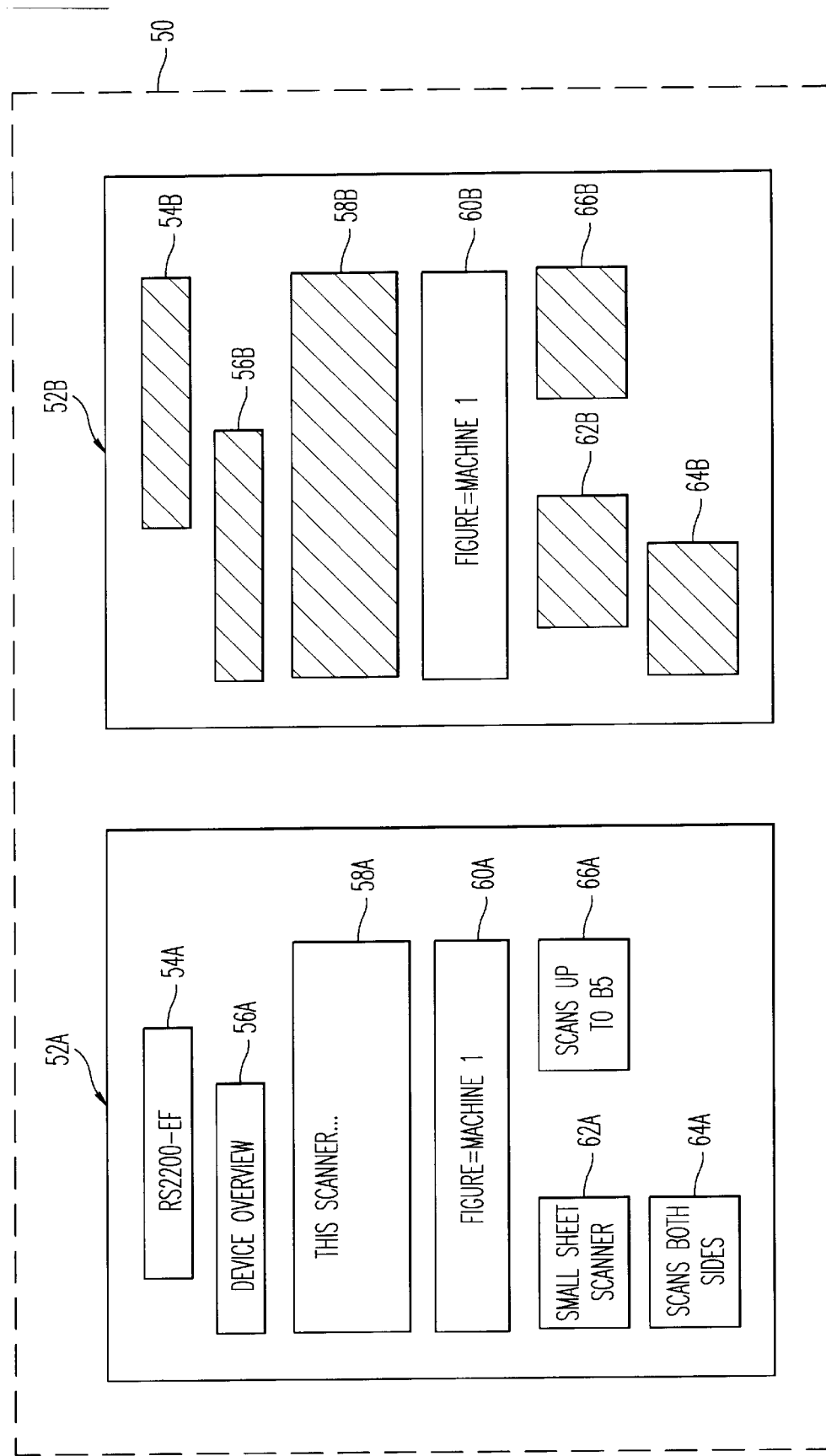
FIG. 3 illustrates the side-by-side display of a source document 52A and the translated document 52B.

FIG. 3 illustrates a screen display 50 containing a section 52A which illustrates the English language version of the document illustrated in FIG. 2, and a translated version of the document on the right side designated by 52B. The left side of FIG. 3 demonstrates that not every tag is displayed when the document of FIG. 2 is printed or generated on an electronic display such as a CRT or a LCD display. In the section 52A, the title or name of the device is designated by 54A, followed by a heading "Device Overview" 56A, and subsequently followed by a paragraph 58A describing the information. A figure is then displayed at region 60A followed by a list of features of the device designated by 62A, 64A and 66A. During the operation of the invention, it is possible to have a side-by-side display of both the original language form of the document and the translated form of the document which allows a user to easily compare the translated document with the original document and make changes, as necessary.

The regions of the translated document 52B have diagonal hatching contained therein but during actual operation of the invention would have the actual translation of the original document 52A. However, no translation has been illustrated in 52B as it is not necessary to the understanding of the operation of the invention and could confuse matters by including, for example, foreign language words or characters in section 52B.

It is not critical that every tag or data be translated by the invention. For example, the title or name of the scanner which is designated by 54A might have the same title or name in the foreign language. The heading Device Overview 56A results from the translation of the tag <OVERVIEW> at line 8 of FIG. 2. The translation of the heading "Device Overview" is a direct translation of the tag and can be stored in a dictionary or in a table associated with the Document Type Definition which indicates what heading should be utilized with the tag <OVERVIEW>. When the tag is not displayed such as the tag <LANG> at line 3 of FIG. 2, there is no need to translate the tag, although this can be performed if desired.

FIG. 3 illustrates that the same figure is contained in both the original document 52A and the translated document 5B. However, if desired, a separate figure which is designated by a user or automatically selected to correspond to the translated language can be used. The information contained within the regions 58A, 62A, 64A, and 66A is translated using the appropriate dictionary and rule data base.

The translation operation performed by the invention is primarily concerned with translating back and forth between different human communication languages such as English, Japanese, German, French, Spanish, Chinese, Russian and all other human languages. However, it is also to apply the teachings contained herein to other types of languages and communications such as translations between different computer languages, for example.

When a section of text such as the text illustrated in region 58A of FIG. 3 is translated, a dictionary containing vocabulary, and translation rules including grammar and language rules are utilized. The use of a dictionary and language rules in translation processes is conventional. A source of information on how conventional machine translation systems work is provided in the book "Machine Translation, An Introductory Guide" by D. Arnold et al. from Blackwell Publishers, 1994. In addition to providing a good introduction to machine translation, this book also provides a listing of numerous other sources describing conventional machine translation operations, the book by Arnold et al. and the other publications cited therein are each incorporated herein by reference. A distinguishing feature of the present invention over the systems disclosed in this book and the cited references is the use of a specific dictionary or specific section of a dictionary and/or the use of specific rule data bases or section or a rule data base, depending on which section of a document or what type of document is being translated.

Figure 4:
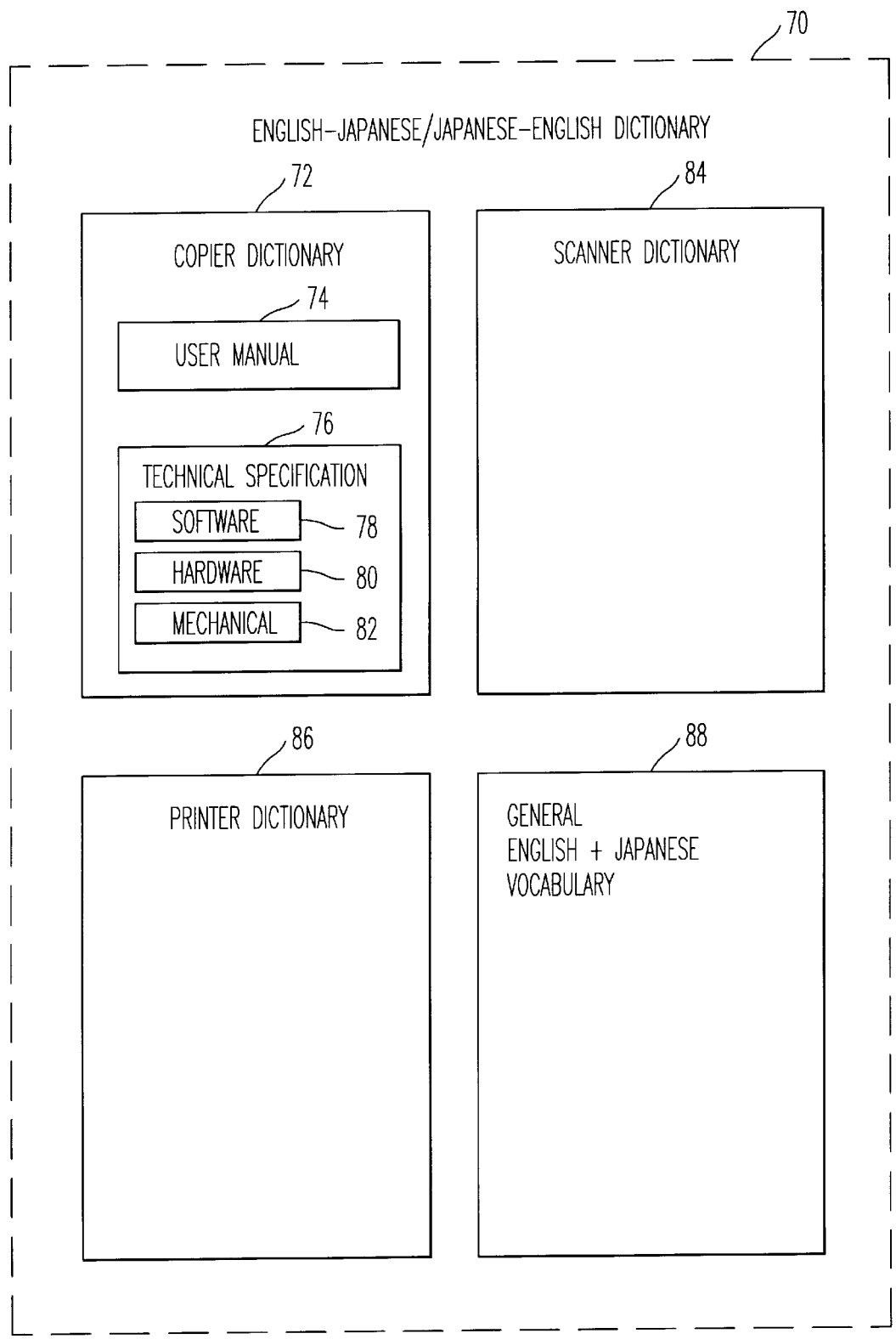
FIG. 4 illustrates a dictionary system utilized by the present invention.

FIG. 4 illustrates an exemplary dictionary which can be used with the present invention. In FIG. 4, there is an English-Japanese/Japanese-English Dictionary 70 having four separate sections including a copier dictionary 72, a scanner dictionary 84, a printer dictionary 86, and a general English and Japanese vocabulary dictionary 88. The copier dictionary 72 is used when a document being translated describes a copier. Further, when the section of the document which is being translated pertains to a copier user manual, the section 74 of the copier dictionary 72 is used. When a technical description of the copier is being translated, the technical specification section 76 is utilized which contains specific sections 78, 80, and 82 which include dictionary information for the software, hardware, and mechanical features of the document describing the copier. The details of the scanner dictionary 84 and printer dictionary 86 have not been illustrated but may be divided in a similar manner as the copier dictionary is divided. Further, the general English and Japanese vocabulary dictionary section 88 is utilized to translate general words which are not specific to or not contained in one of the other dictionaries.

Dictionaries and rule data bases may be divided at the highest hierarchical level into different domains. For example, there can be a copier domain, a scanner domain, and a printer domain. When documents which are translated are contained within one of these domains, the dictionaries and rules which are utilized to perform the translation are taken from the corresponding domain.

The information contained within the dictionaries and the specific dictionary sections is stored in any desired manner including a conventional manner, if desired. An important feature of the present invention is using different dictionary information with different sections of different types of documents. However, other arrangements of dictionaries can be utilized as compared to what is illustrated in FIG. 4. For example, separate dictionaries might be used for different sections or different types of documents but it is possible to share a dictionary between different types of documents but utilize different sections of the same dictionary, as desired.

The different dictionaries or sections can be selected through the use of pointers which indicate which dictionary is to be used. Further, as the dictionaries are being created, modified, or utilized, the information in one dictionary can be copied to another dictionary, as desired.

Figure 5:
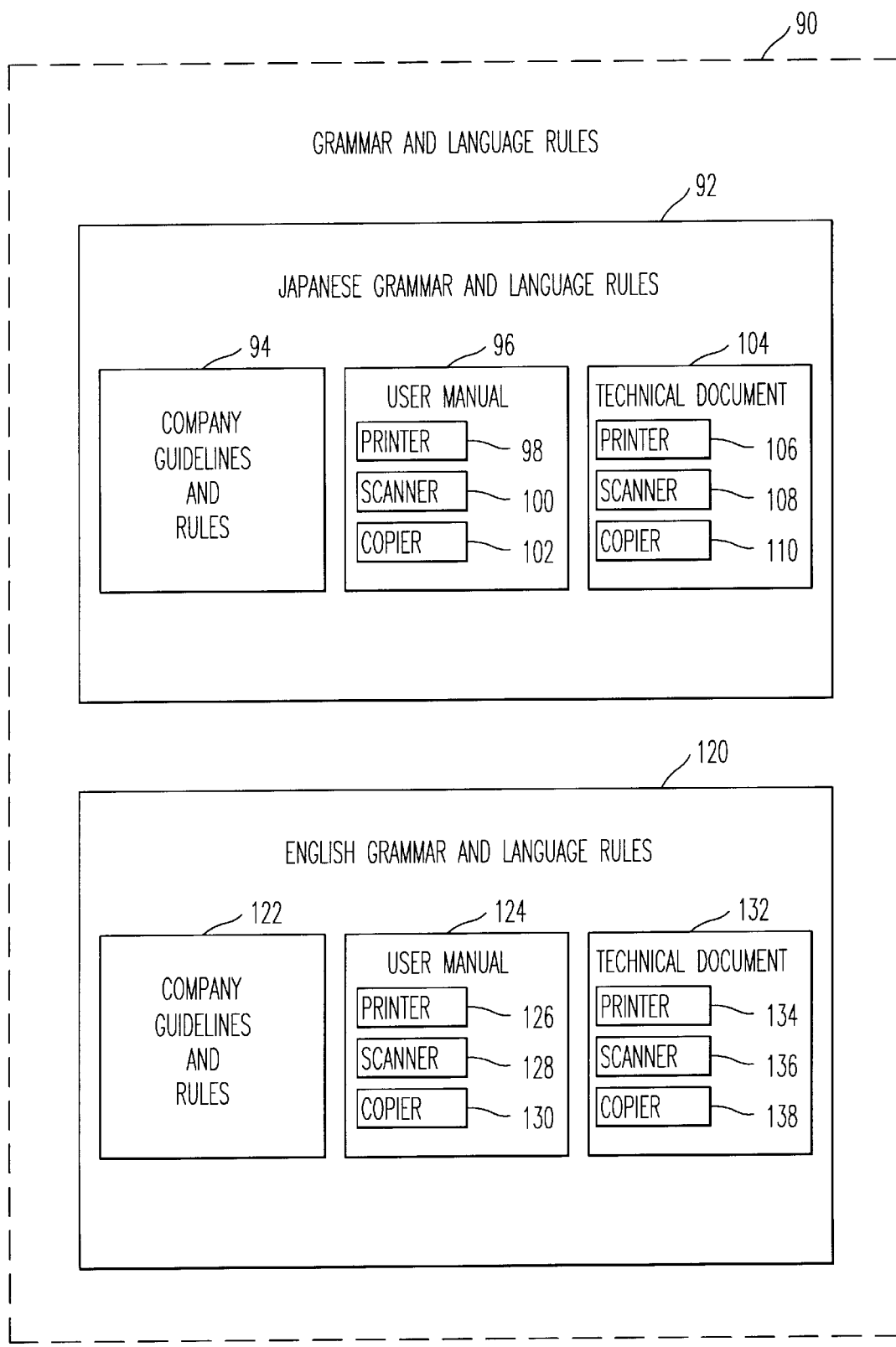
FIG. 5 illustrates translation rules such as grammar and language rules which are utilized by the present invention.

FIG. 5 illustrates an exemplary arrangement of a grammar and language rules data base 90 which is used in the translation process of the invention. The data base contains Japanese grammar and language rules 92 which include grammar and language rules utilized when translating company guidelines and rules 94, when translating user manuals including user manuals directed to printers, scanners, or copiers, each having their own rules 98, 100, and 102 respectively, and a section 104 used for translating technical documents including documents pertaining to printers 106, scanners 108, and copiers 110. The data base 90 also contains English grammar and language rules 120 which also contains rules for translating company guidelines and rules 122, rules 124 for translating user manuals including rules 126, 128 and 130 for translating printer, scanner, and copier user manuals respectively, and rules 132 for translating technical documents including rules 134, 136, and 138 for respectively translating technical documents relating to printers, scanners, and copiers.

The grammar and language rules which are stored in the data base 90 are conventional grammar and language machine translation rules and therefore, one of ordinary skill in the art would know how to construct such rules. However, the rules are specifically tailored to the present invention and have different sections or different specific rules for translating different portions of the document.

Figure 6:
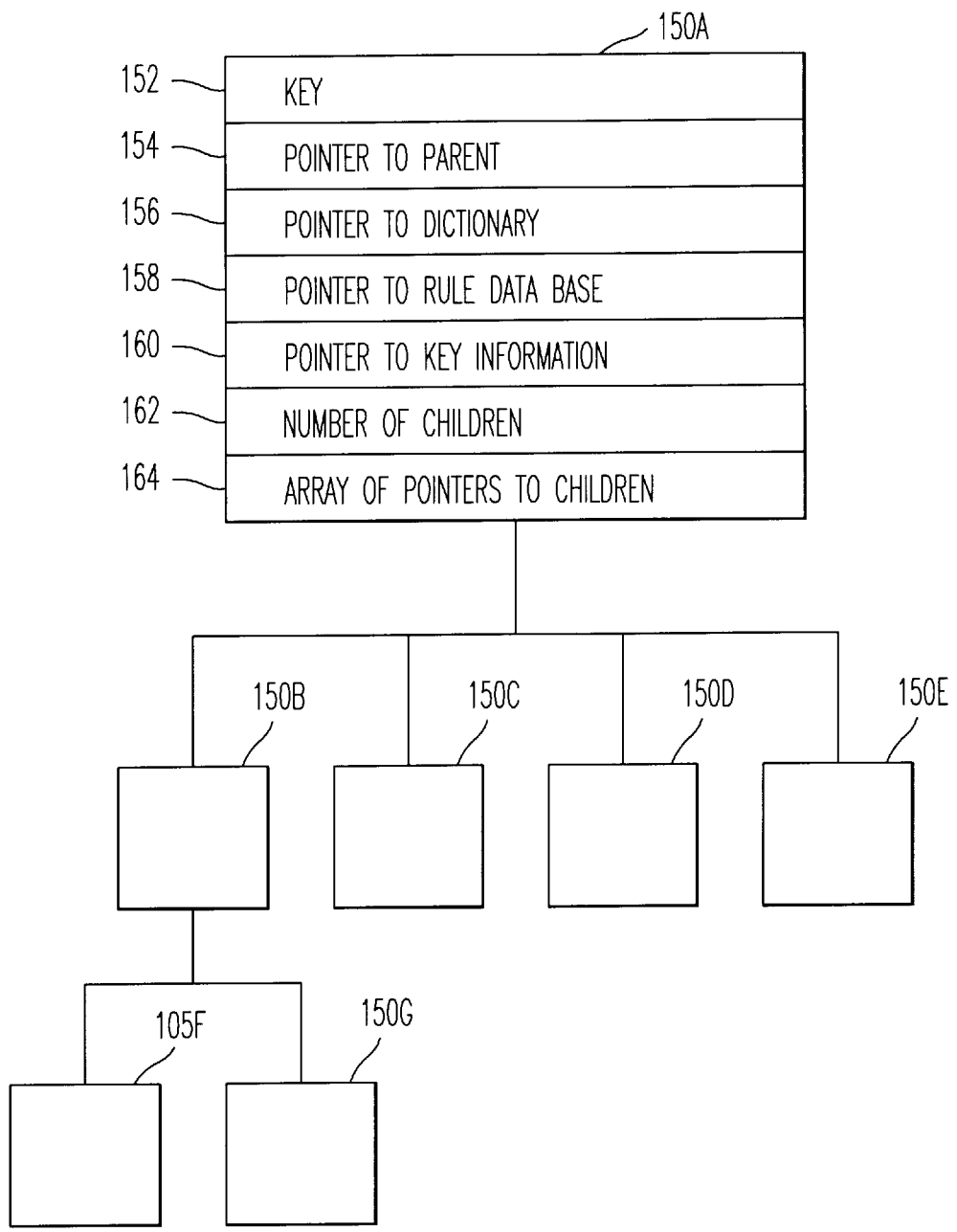
FIG. 6 illustrates a hierarchical organization of data structures used to select the dictionaries and rule data bases which are utilized by the different sections of the document.

FIG. 6 illustrates a preferred manner of storing information of the location and hierarchical structure of the dictionary and rule data bases so that they can be conveniently selected and utilized by the different sections of a document. Each of the data structures 150A–150G have the same structure so the detailed fields of the data structures 150B–150G have not been illustrated. A key field 152 is any unique identifier for the data structure. For example, the key can simply be a number but alternatively could be a name. For the highest hierarchical level 150A, it is not absolutely necessary to have a key and the key can be set equal to null. The data structure 150A contains a pointer 154 to a parent data structure so that it is possible to easily travel up the hierarchical tree of data structures illustrated in FIG. 6. However, as the data structure 150A is at the highest hierarchical level, it does not have a parent and the pointer to the parent data structure 154 is set equal to null. The dictionary utilized for the translation of the corresponding hierarchical level of the document is located at the address contained within the pointer to dictionary field 156. Similarly, the address of the rule data base used to translate the corresponding section of the document is located at an address corresponding to the pointer to rule data base field 158.

A field 160 contains a pointer to key information. This can be a pointer to a table containing a key, corresponding to the structure of the key element in field 152, and a separate field for input information. For example, Table I contained below contains a column of input information which describes the name of a tag which causes the selection of the dictionary and rule, and a column containing the keys which correspond to the input information.

TABLE I

Key Information

| Input Information | Key |
|---|---|
| DEVICE | 10 |
| Reprographic Machine | 11 |
| Copier | 11 |
| Scanner | 12 |

The data structure 150A further contains a field 162 which contains the number of children data structures. For example, 150A contains four children data structures 150B, 150C, 150D, and 150E. Last, field 164 contains an array of pointers to the various children data structures 150B-150E.

When it is desired to go to a next lower level in the hierarchy, a tag within the document being translated is read which indicates the dictionary and rule data base which is to be utilized. For example, upon processing line 5 of FIG. 2 which indicates that the document describes a scanner, Table I is searched to find the entry scanner which has a key of 12. The data structures in the next lower hierarchical level are searched using the number of children and array of pointers to children in order to locate the dictionary which has the key 12. In this manner, it is possible to efficiently search and keep track of dictionary and rule data base information corresponding to the hierarchical level and type of document which is being translated.

The present invention translates documents which contain indications of different sections which may be hierarchical levels of the document. In order for the machine translating device to know when the sections or hierarchical levels begin or end, the document to be translated must contain an indication of the beginning of each section. A convenient manner of indicating the different sections of a document is through the use of tags. The tags are preferably arranged in accordance with the Standard Generalized Markup Language (SGML) but any other manner of indicating the different sections of the document can be utilized, as desired. The SGML tags which are used by the invention to indicate the different sections are required to conform with a specific Document Type Definition (DTD) in accordance with the rules of SGML. It is probable that in order for the invention to efficiently operate, a new DTD must be created. There are known DTDs which exist and one of ordinary skill in the art could develop a new DTD based on the teachings contained herein without undue experimentation. An exemplary SGML Document Type Definition which would probably not be directly used by the present invention but shows how a DTD is to be structured is the DTD in Annex E of the International Standard ISO 8879–1986(E) beginning at page 136.

Figure 7:
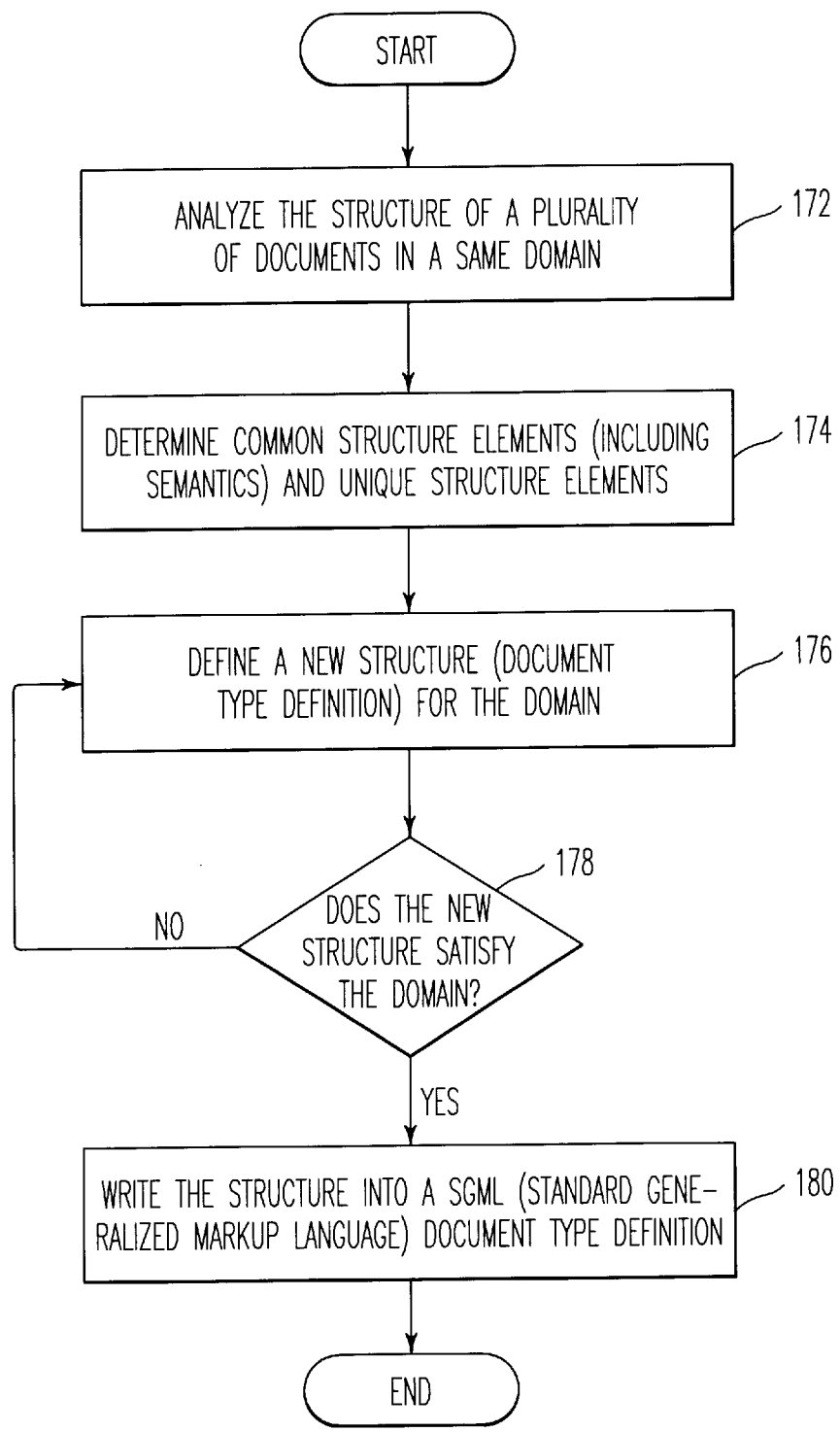
FIG. 7 illustrates a flowchart of a process for creating a document type definition.

FIG. 7 illustrates a process of creating a Document Type Definition. After starting, step 172 analyzes the structure of a plurality of documents which are in a same domain. This may be done automatically, by a person, or by a combination of a machine and a person. Step 174 then determines the common structural elements (including the semantics) and unique structure elements for the different documents. Based on the common structure elements and unique structure elements and also the semantics, step 176 defines a new structure which is a document type definition for the domain. As an example, the structure of a document describing scanners may have, as illustrated in FIG. 1, four major sections including the overview section 32, the hardware section 40, the software section 42, and the accessories section 44. Further, the overview section 32 can include a section defining the device, a figure, and a list of features. Step 178 then determines if the new structure which has been defined (e.g., the DTD) satisfies the domain, meaning that the documents can be represented using the DTD. If they cannot, flow returns back to step 176 to redefine or alter the DTD. If the structure is acceptable and satisfied the domain, step 180 writes the structure into a SGML document type definition and the process of FIG. 7 ends.

Figure 8:
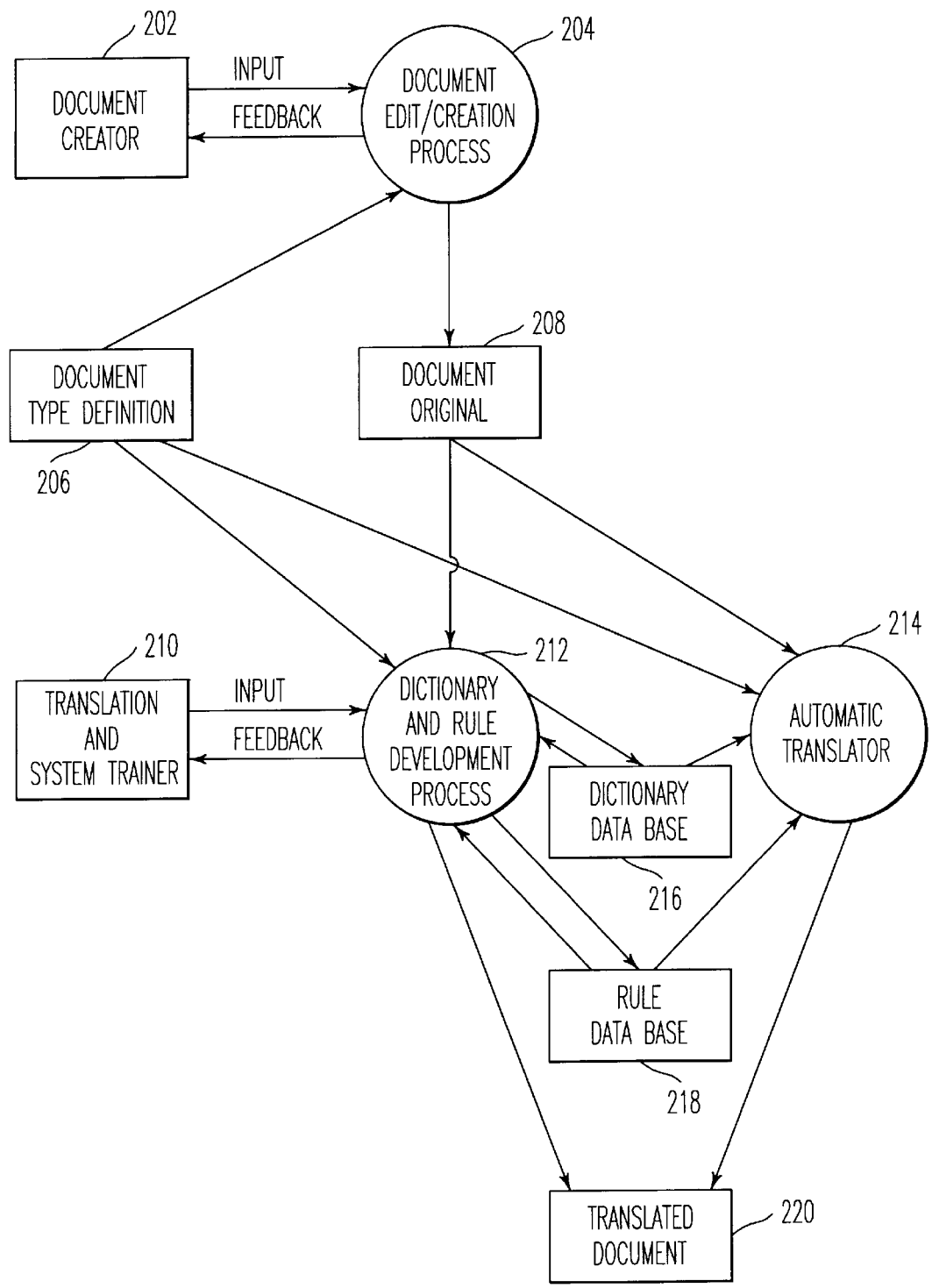
FIG. 8 is a data flow diagram of the general operation of the invention.

FIG. 8 is a data flow diagram showing the general operation of the invention. In FIG. 8 and also the data flow diagram of FIG. 16, the circles indicate a process, the information contained within two horizontal lines indicates some type of data, and the boxes or squares indicate a user or other device which performs an operation. In the data flow diagram of FIG. 8, a document creator 202 creates a document using a document edit/creation process 204. Input from the document creator 202 is utilized in the document edit/creation process 204 along with a previously created document type definition 206. If the document edit/creation process 204 detects a problem with the document being created or edited, feedback is provided to the document creator 202. Examples of problems include a violation of company guidelines and ambiguous statements. The result of the document edit/creation process 204 is the document original 208.

The data flow diagram of FIG. 8 includes a translation and system trainer 210 which is utilized to develop the translation and dictionary rules. A dictionary and rule development process 210 receives the document type definition 206, the document original 208, and input from the trainer 210 and develops the dictionary data base and rule data base. The original document 208 is input to the dictionary and rule development process 212 and/or the translator 214 from a disk, RAM, or any other storage medium, or from a communication line such as a network or from a modem. Further, the dictionary and rule development process 212 provides feedback to the translation and system trainer 210. During the training process, and during the translation process, if desired, the dictionary and rule development process 210 utilizes a dictionary data base 216 and a rule data base 218 in order to generate a translated document 220. The dictionary or dictionaries and/or rule data base(s) used by the translation process are considered translation information or translation resources. However, the translation information or translation resources are not limited to just dictionaries and rule data bases but other resources or information which assist with or perform the translation process are also translation information or translation resources.

The data flow diagram also includes an automatic translator 214 which utilizes the document type definition 206, the document original 208, the dictionary data base 216, and the rule data base in order to automatically generate the translated document 220. The translated document is saved to memory such as a disk, RAM, or any other type of memory, printed by a printer, and/or output to another computer through a network, modem, or another communication line, and/or printed on a printer.

FIGS. 9A–9C and 10 illustrate a process corresponding to the dictionary and rule development process 212 illustrated in FIG. 8. This process is utilized to not only develop the dictionary and rules but can also be used to perform a translation process. After starting in FIG. 9A, step 230 reads the next token of the document to be translated. When first starting, this is the first token of the document which can be a tag or section of data to be translated. Step 232 then determines whether the token is a tag. If it is, flow proceeds to step 234 which determines if the token is a start tag. If the token is determined to be a start tag, step 240 determines if the previous hierarchical level of the document ended without an end tag. As previously explained, it is possible for an end tag to be omitted and the end of a particular tag can be automatically detected with the document type definition being known. Therefore, if step 240 determines if the previously hierarchical level has ended without an end tag, step 242 is performed which moves up a hierarchical level or several hierarchical levels because the start tag which has just been encountered signifies that a previous tag or multiple tags have ended. When the determination of step 240 is negative or after the performance of step 242, flow proceeds to process B illustrated in FIG. 9B.

Figure 9A:
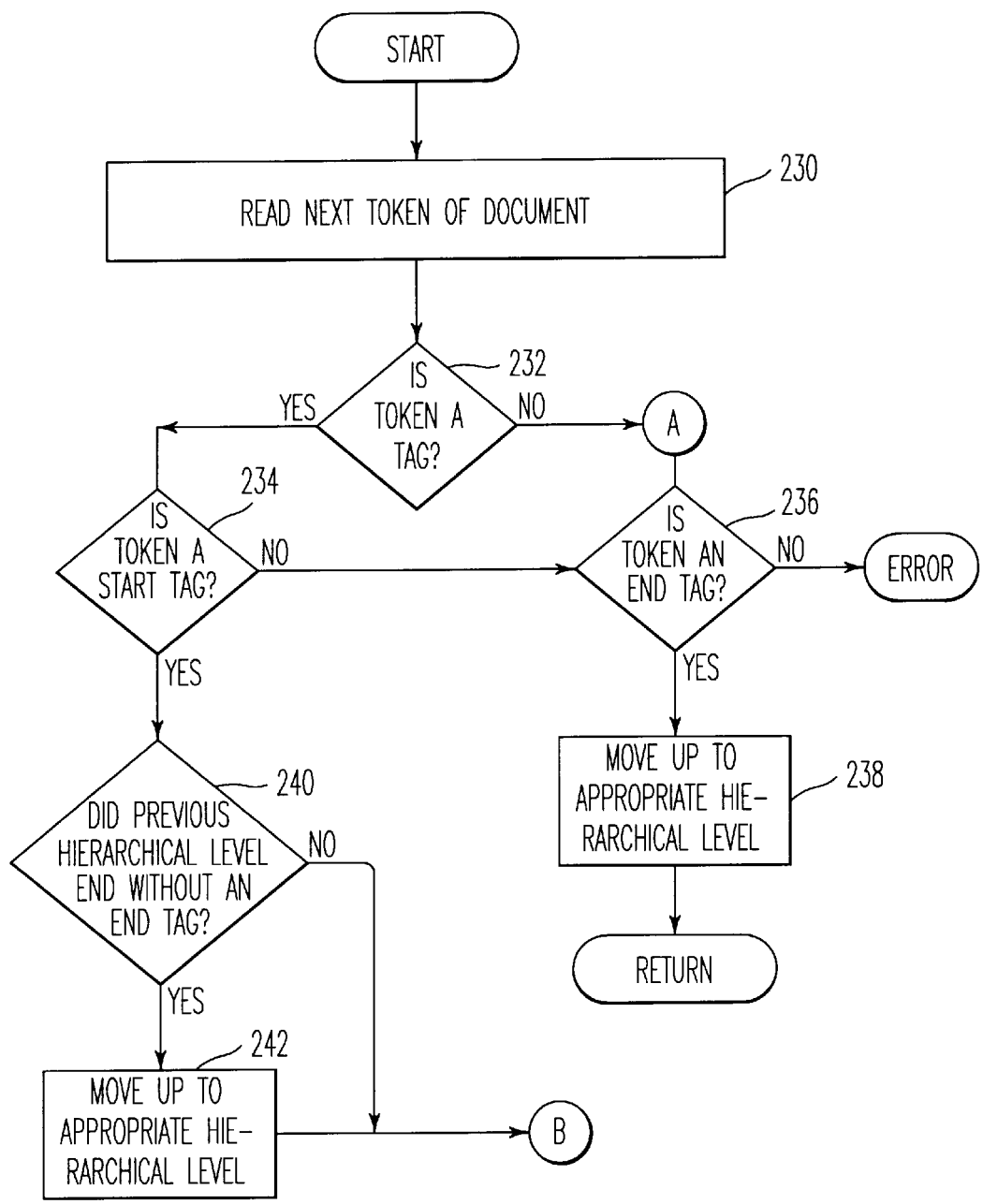
FIGS. 9A–9C illustrate a process used for training the system to perform proper translation and also an embodiment for performing the translation.
Figure 9B:
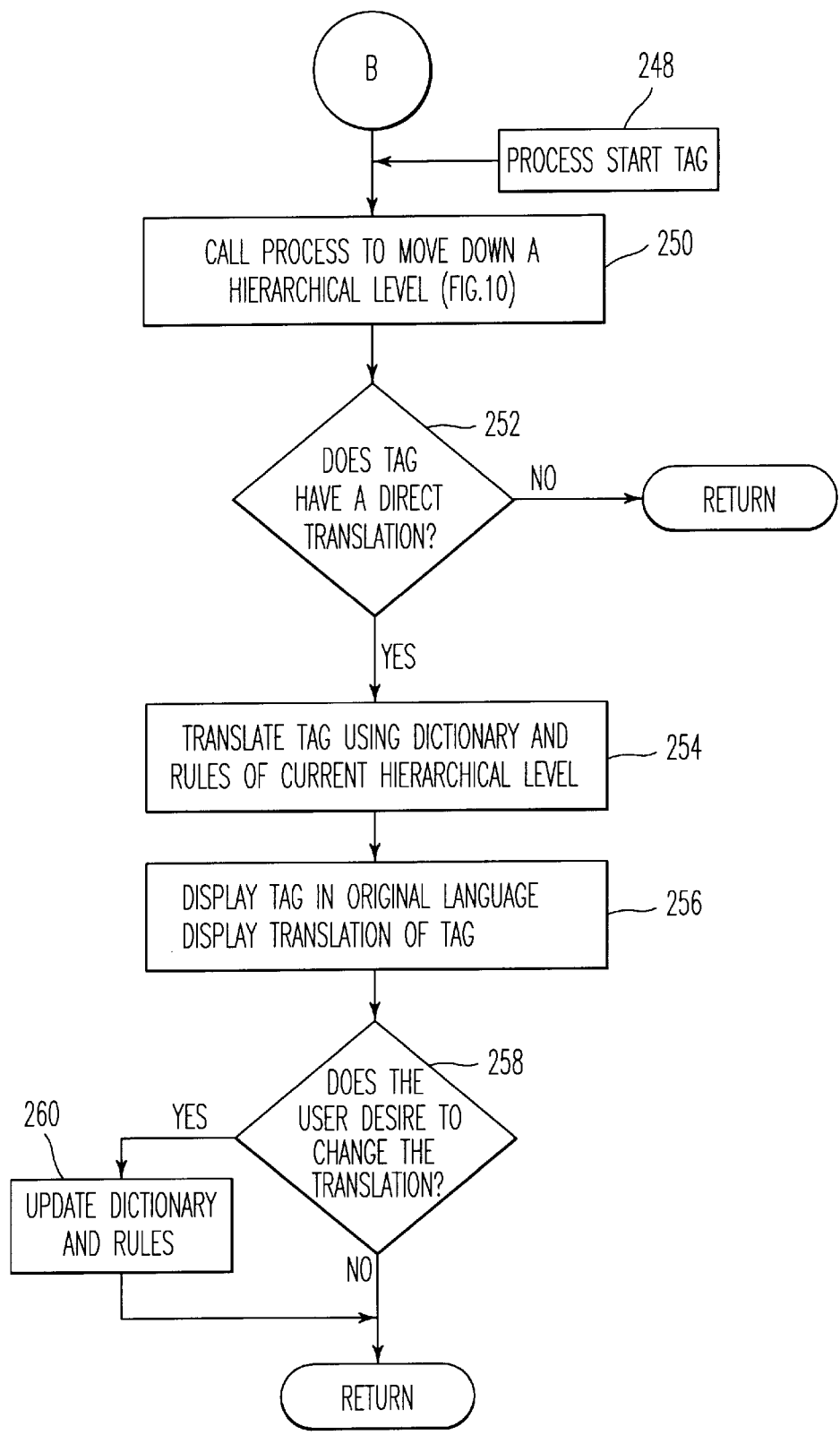
Figure 10:
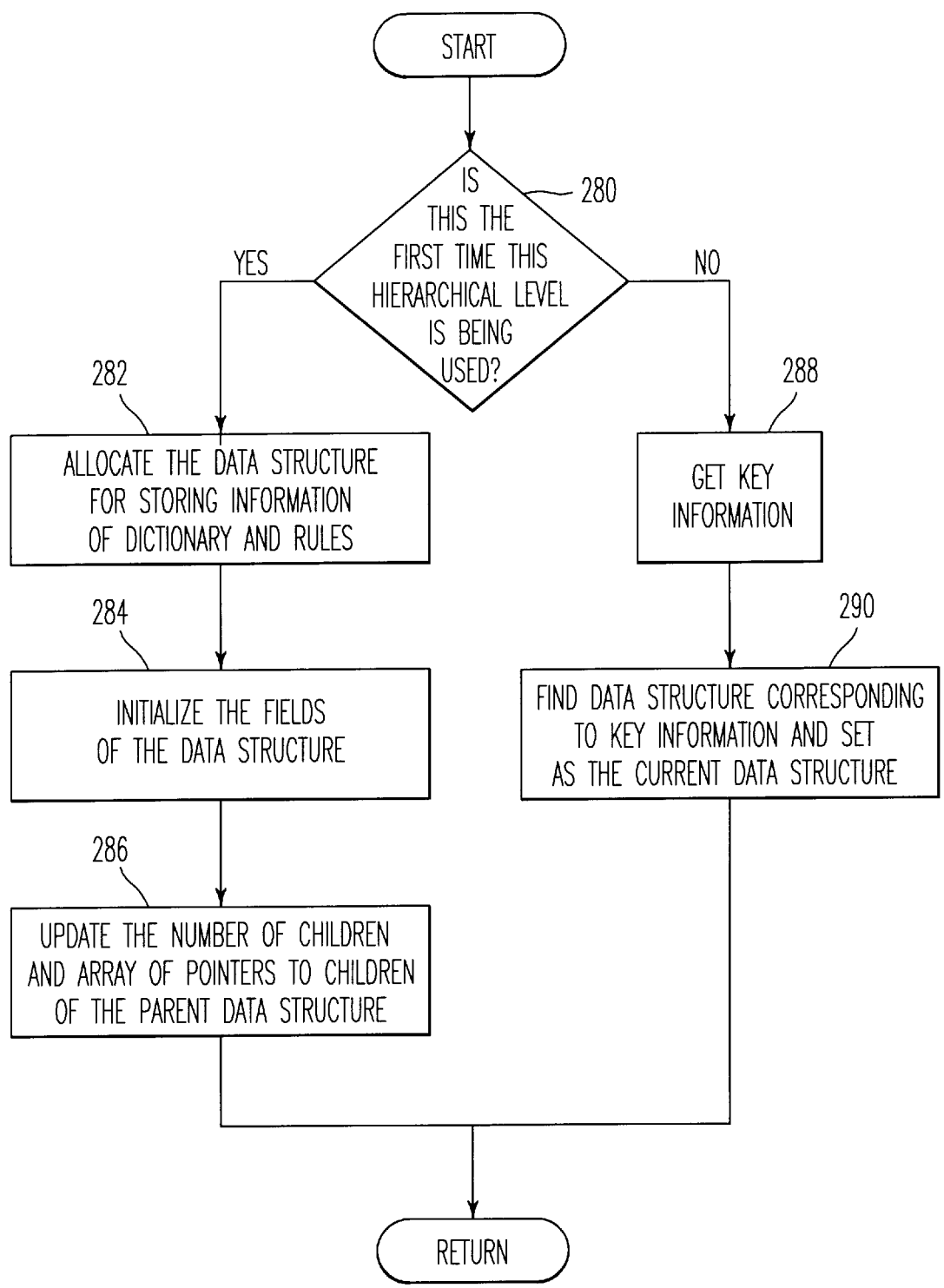
FIG. 10 illustrates a process for moving to an existing lower hierarchical level or creating a new lower hierarchical level in the data structures for storing information of the dictionaries and rule data bases.

In FIG. 9B, step 248 processes the start tag in order to determine the attributes, if any, of the start tag. For example, see lines 4, 10, etc. of FIG. 2. Step 250 calls the process to move down a hierarchical level which is illustrated in FIG. 10. The document being translated is arranged into different hierarchical levels and when a new hierarchical level is encountered which is indicated by a new start tag, it is necessary to adjust the data structures such as the data structures illustrated in FIG. 6 so that the proper dictionary and rule data base are created, if necessary, and utilized.

In FIG. 10, after starting, step 280 determines if this is the first time this particular hierarchical level and structural tag are being used. For example, when the tag has never been used, it is necessary to create the data structures for storing the hierarchical information indicating the dictionaries and rules which are to be used, such as the data structures illustrated in FIG. 6. If the hierarchical level or tag has previously been used, the new data structure should not be redundantly allocated as it has previously been allocated. If step 280 determines that this is the first time the hierarchical level is being used, a data structure for storing information of a dictionary and translation rules such as the data structure 150A illustrated in FIG. 6 is allocated. Step 284 initialized the fields of this created data structure to contain the necessary information. For example, a unique identifier must be created for the key 152, the pointer to the dictionary 156 and the pointer to the rule data base 158 must be set and the new dictionary and rule data base which are utilized created or copied, and the pointer to key information 160 initialized in order to be able to determine the key in the future. It is also necessary to update the table containing the key and key information. Further, the pointer to the parent 154 must be set to point to the parent data structure in the next higher hierarchical level, the number of children set to zero, and the array of pointers to children to point to null as there are no children at this time for the newly created data structure. In step 286, the parent data structure must be updated so that the number of children and the array of pointers to children accurately reflect the creation of the new dictionary.

If step 280 determines that this is not the first time the hierarchical level is being used, step 288 obtains the key information from the tag. Once the key information is known, the key can be found utilizing a table such as Table I. Step 290 then finds the data structure corresponding to the key information which is the data structure having the key which corresponds to the key information. This data structure is set as the current data structure used for the translation process of the current tag. From steps 290 and 286, flow returns to the calling process which in this case is back to step 252 in FIG. 9B.

In step 252 of FIG. 9B, it is determined whether the tag has a direct translation. If the tag does not have a direct translation, it may not be necessary to translate the tag as it is never displayed to the user. The tag can be used for document structuring purposes but is not actually displayed and therefore, it does not matter what language the tag is in as long as the process used to present the document recognizes the form of the tag. When the tag does not have a direct translation, flow returns to the calling process. Subsequently, the process of FIG. 9A can be repeated in order to read the next token of the document.

If step 252 of FIG. 9B determines that the tag does have a direct translation, the tag is translated using the dictionary and rules of the current hierarchical level. Alternatively, the translation of the tag can be defined within a table associated with the DTD and translated using this table in a simple one-to-one manner. As a further alternative, the translation of the tag can be obtained from a previous translation of the document and is used to train the system. Next, step 256 displays the tag in its original language and also displays the translation of the tag. This corresponds to the display of sections 56A and 56B illustrated in FIG. 3. In step 258, the user is asked if it is desired to change the translation. If the translation is to be changed, the dictionary and rules are updated, as necessary, in order for future translations to reflect the user's desire. Flow then returns to the calling process in order to translate and train using further information contained within the document.

In FIG. 9A, if step 234 determines that the token being processed is not a start tag, step 236 determines if the token is an end tag. If it is not, an error is indicated because the token must be either a start tag or an end tag because step 232 determined the token is a tag. If step 236 determines that the token is an end tag, step 238 adjust the hierarchical structure illustrated in FIG. 6 so that the appropriate data structure is used for future translations. By moving up a hierarchical level or multiple hierarchical levels of the document, the next highest data structure towards the top of the page in FIG. 6 is then selected. When an end tag (or omission thereof) indicates more than one hierarchical level has ended, the appropriate number of hierarchical levels are moved up. Flow then returns to the calling process and additional information contained within the document, if it exists, can be used for training and translated by repeating the process of FIGS. 9A–9C.

Figure 9C:
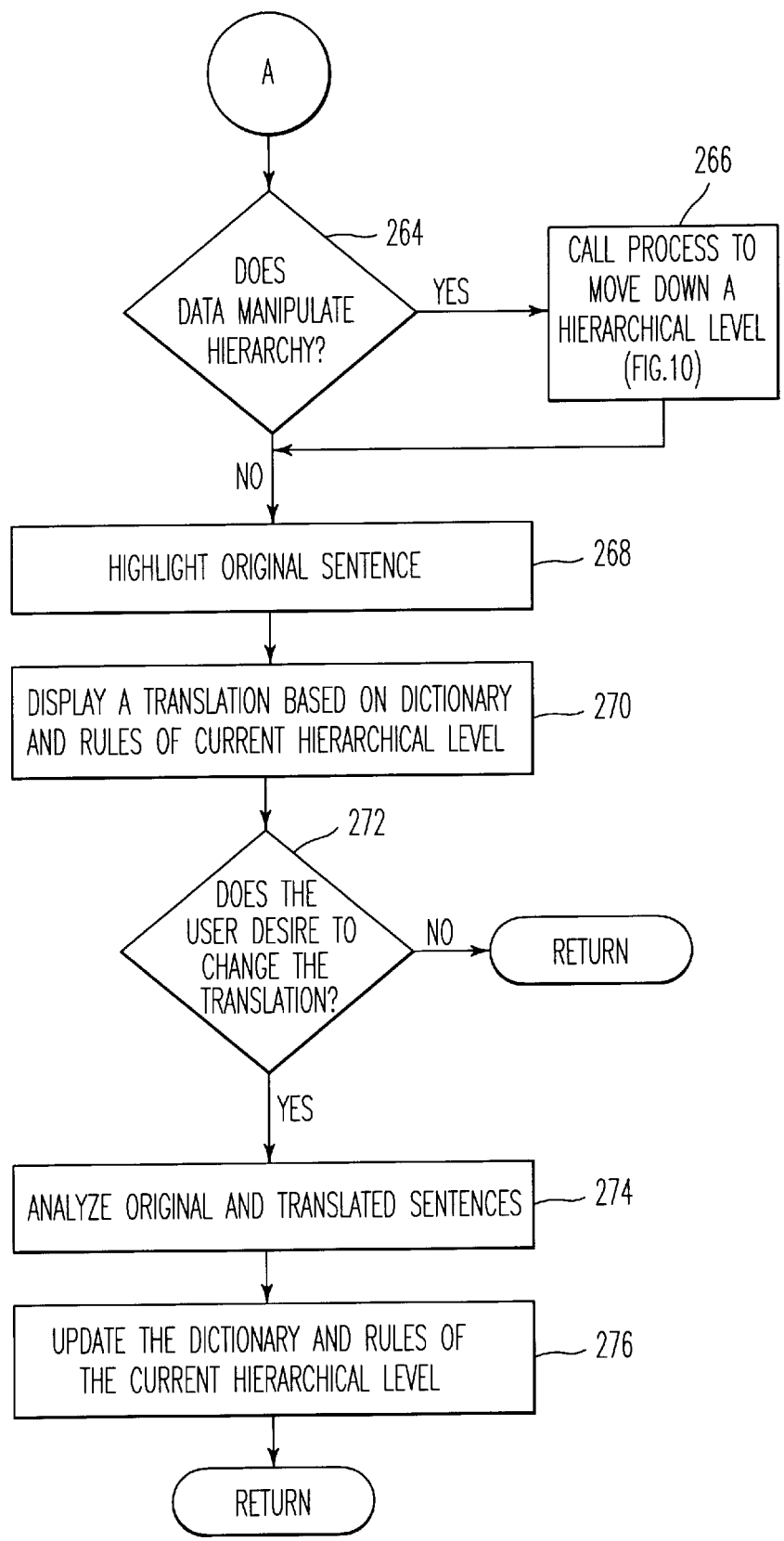

If step 232 determines that the token is not a tag, the token must be data and flow proceeds to process A illustrated in FIG. 9C. In FIG. 9C, step 264 determines if the data manipulates the hierarchy. An example of the data manipulating the hierarchy can be seen in line 5 of FIG. 2 where the data is "Scanner". The data "Scanner" indicates that the hierarchy which is to be used is for the scanner domain. If the data does manipulate the hierarchy, flow proceeds to step 266 which causes the process to move down a hierarchical level which is performed using the process of FIG. 10. FIG. 10 has already been explained with respect to step 250 of FIG. 9B so it will not be explained again to avoid redundancy. From step 266 or when the data does not manipulate the hierarchy, the original sentence which is being translated is highlighted in step 268 (e.g., when displayed in a manner as illustrated in FIG. 3 and highlighted). A translation is also displayed of the highlighted sentence using the dictionary and rules of the current hierarchical level in step 270. This results in a display of the original and translated information next to each other such as the information 58A and 58B illustrated in FIG. 3.

Step 272 then determines if the user desires to change the translation. If the user does not, the flow returns so that additional information within the original document can be translated. If the user does desire to change the translation, the user enters the newly transmitted information in step 274 and the original and previously translated sentences are analyzed in order to determine the differences between the translation desired by the user and the translation performed automatically. Subsequently, the dictionary and rules of the current hierarchical level are updated in step 276 so that future translations of the same or similar phrases will result in the desired translation. The process of FIG. 9C then returns to the calling process.

It is to be noted that if a dictionary and translation rules do not exist or are not complete when step 270 is performed, in order to perform a complete or adequate translation it is not essential that the translation be displayed but an indication can be given that sufficient information does not exist to perform the translation. Further, when the training process of the translator is performed using an original document to be translated and a previously created translation of the document, step 270 will display the previously created translation and if the user does not desire to change the translation, the dictionary and rules of the current hierarchical level will be reviewed and changed, if necessary, in order for future automatic translations of the original document to result in a translation which is the same as the previously performed translation.

During the training performed by the flowcharts of FIGS. 9A–10, a data structure as illustrated in FIG. 6 can be created for each tag or for each of the different hierarchical levels of the document. This may create a very large number of data structures and corresponding dictionaries and rule data bases. However, in order to reduce the number of data structures 150 and to reduce number of dictionaries and rule data bases, the invention will, if desired, compare the different dictionaries to each other and compare the rule data bases to each other in order to look for similarities. If similarities are found, the data structures and/or dictionaries and rule data bases are consolidated or aggregated together. It is also possible to combine the dictionaries and rule data bases simply to reduce their number. The combination of the different dictionaries and/or rule data bases may also be preferable when one contains a small number of entries which do not contradict or is not different from other translation resources. By combining the dictionaries, the number of dictionaries and rule data bases and/or the number of data structures used to keep track of the dictionaries will be reduced. Reduction of dictionaries and rules also allows the hierarchical structures to be consolidated and simplified. However, it is not necessary to combine the different translation resources including the data structures, if this is not desired. By using specific dictionary information and rules for the different sections of the document, the translation becomes more accurate and becomes closer to a one-to-one correspondence between the source document and translated document without the burdens or difficulties which arise from using translation systems which are limited to the use of canned phrases.

Figure 11:
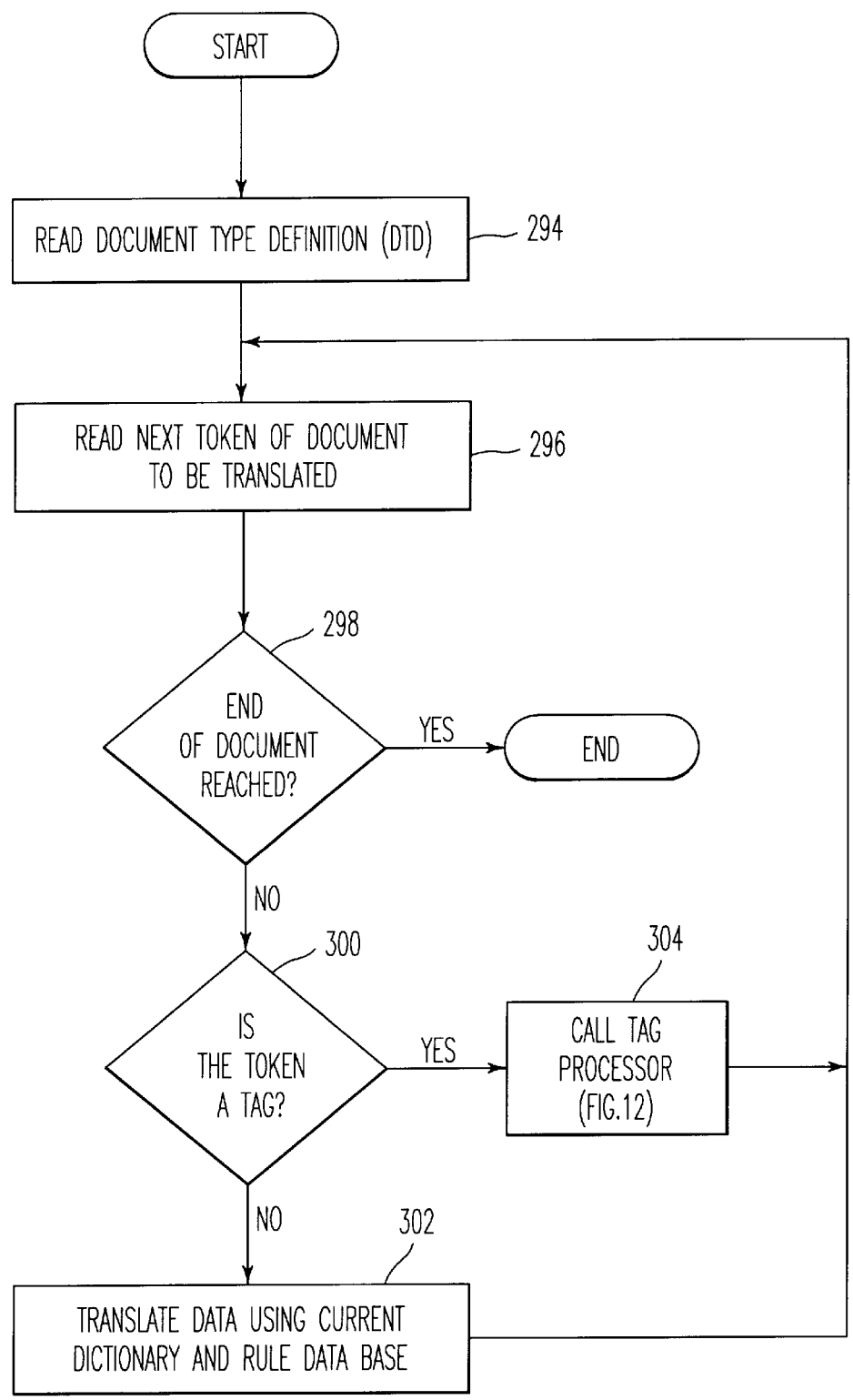
FIG. 11 illustrates a process for performing automatic translation after the system is set up and trained.

FIG. 11 illustrates the process performed by the automatic translator 214 of FIG. 8. After starting, step 294 reads the document type definition (DTD) which defines the permissible structure of the document. Step 296 then reads the next token of the document which is to be translated. This token is either a tag or data to be translated. Step 298 determines if the end of the document has been reached. If it has, the automatic translation process ends. If the end has not been reached, step 300 determines if the token is a tag. If it is not a tag, the token is data and the token is translated using the current dictionary and rule data base which is determined using the current data structure such as one of the data structures illustrated in FIG. 6. If the token is a tag, flow proceeds from step 300 to step 304 which calls the tag a processor illustrated in FIG. 12.

Figure 12:
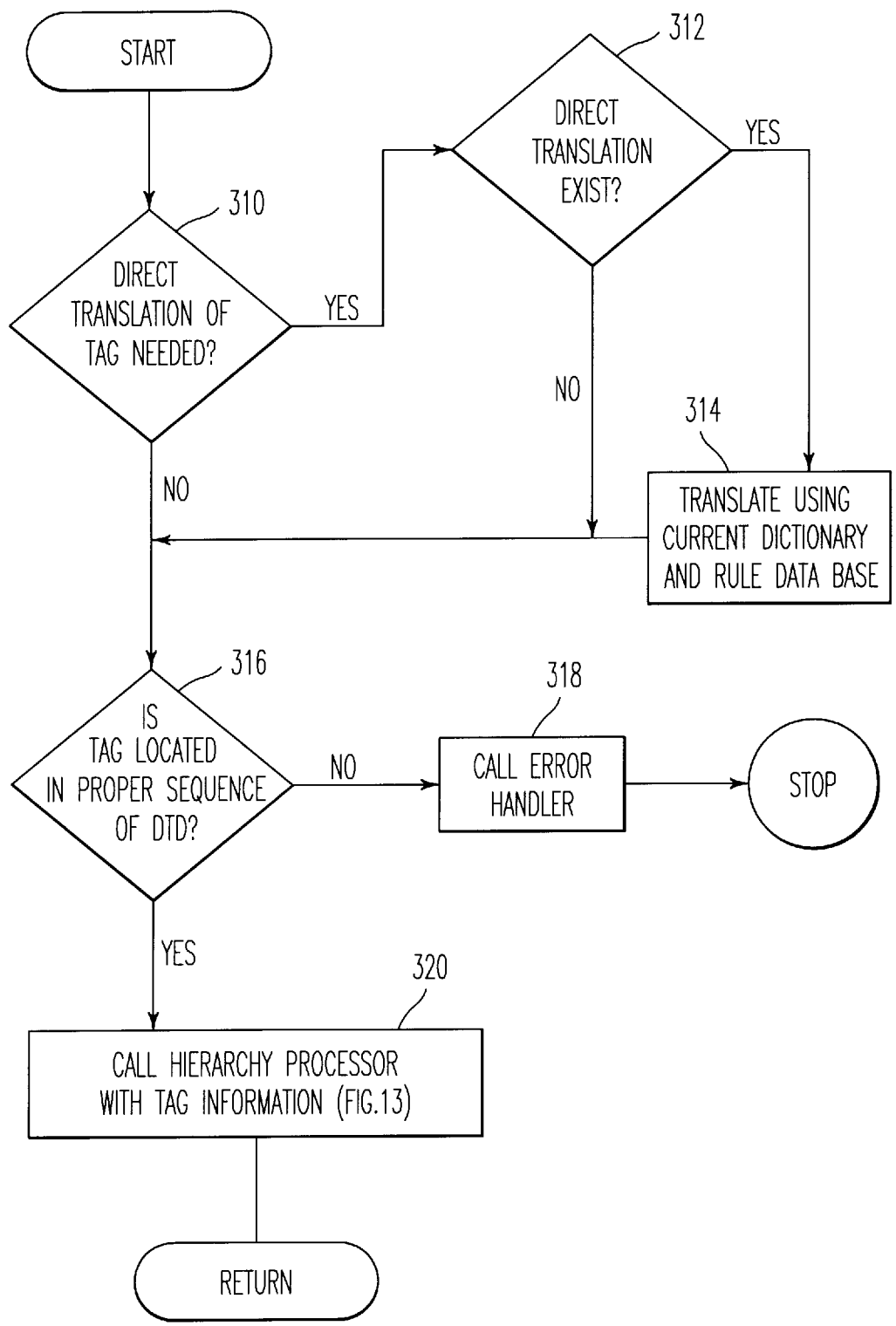
FIG. 12 illustrates a process for automatically translating tags of a document.

In FIG. 12, step 310 determines if a direct translation of the tag is needed. A direct translation of the tag will be needed when the translated tag is displayed within the document and is not simply for document structuring purposes. If a translation is needed, step 312 determines if the direct translation exists. If it does, the tag is translated using the current dictionary and rule data base. If a direct translation does not exist, a translation is not performed as the necessary information does not exist. At this time, an error message can be displayed to the user, if desired, indicating a direct translation does not exist. Step 316 determines if the tag is located in the proper sequence of the DTD. If it is not, an error handling routine is called in step 318 and the process then ends. Next, step 320 calls the hierarchy processor which is illustrated in FIG. 13 with the necessary tag information.

Figure 13:
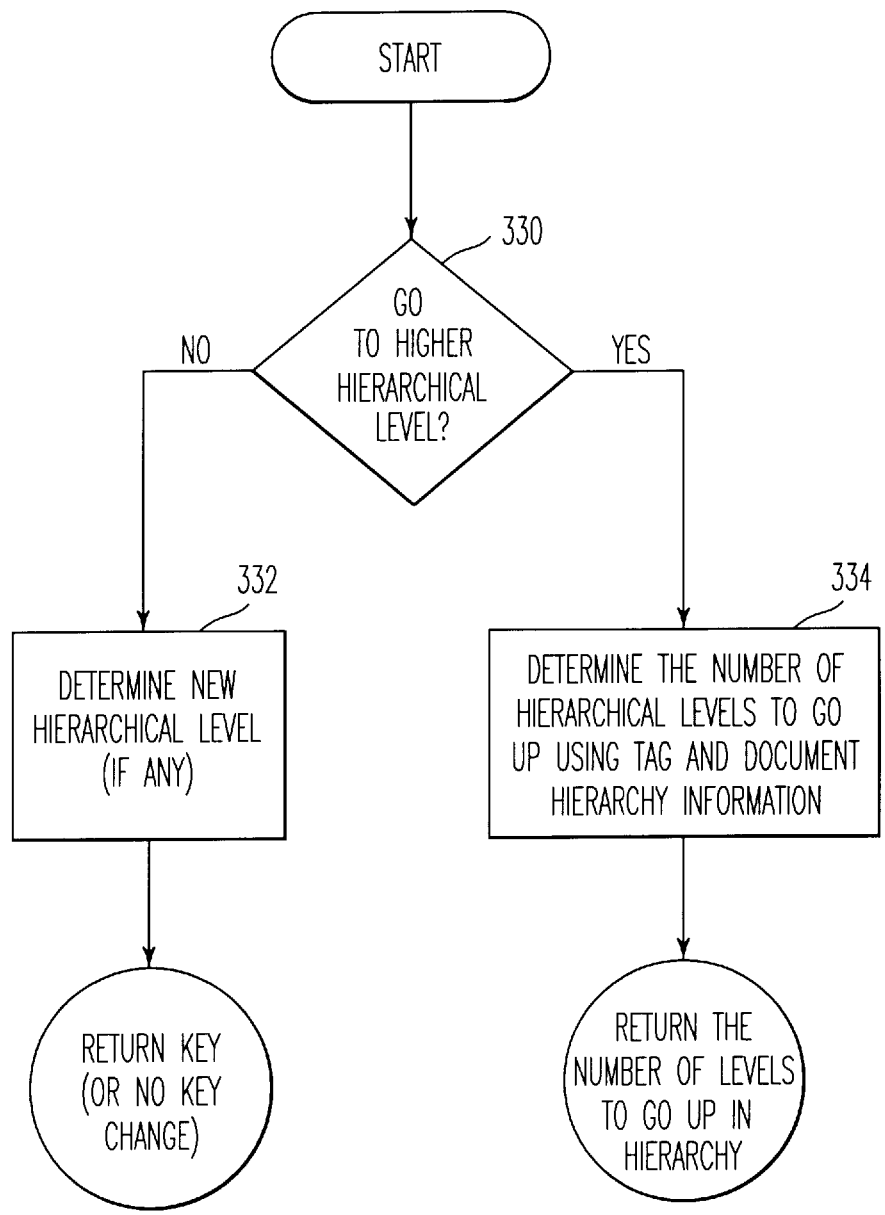
FIG. 13 illustrates the process of changing hierarchical levels within a document.
Figure 14:
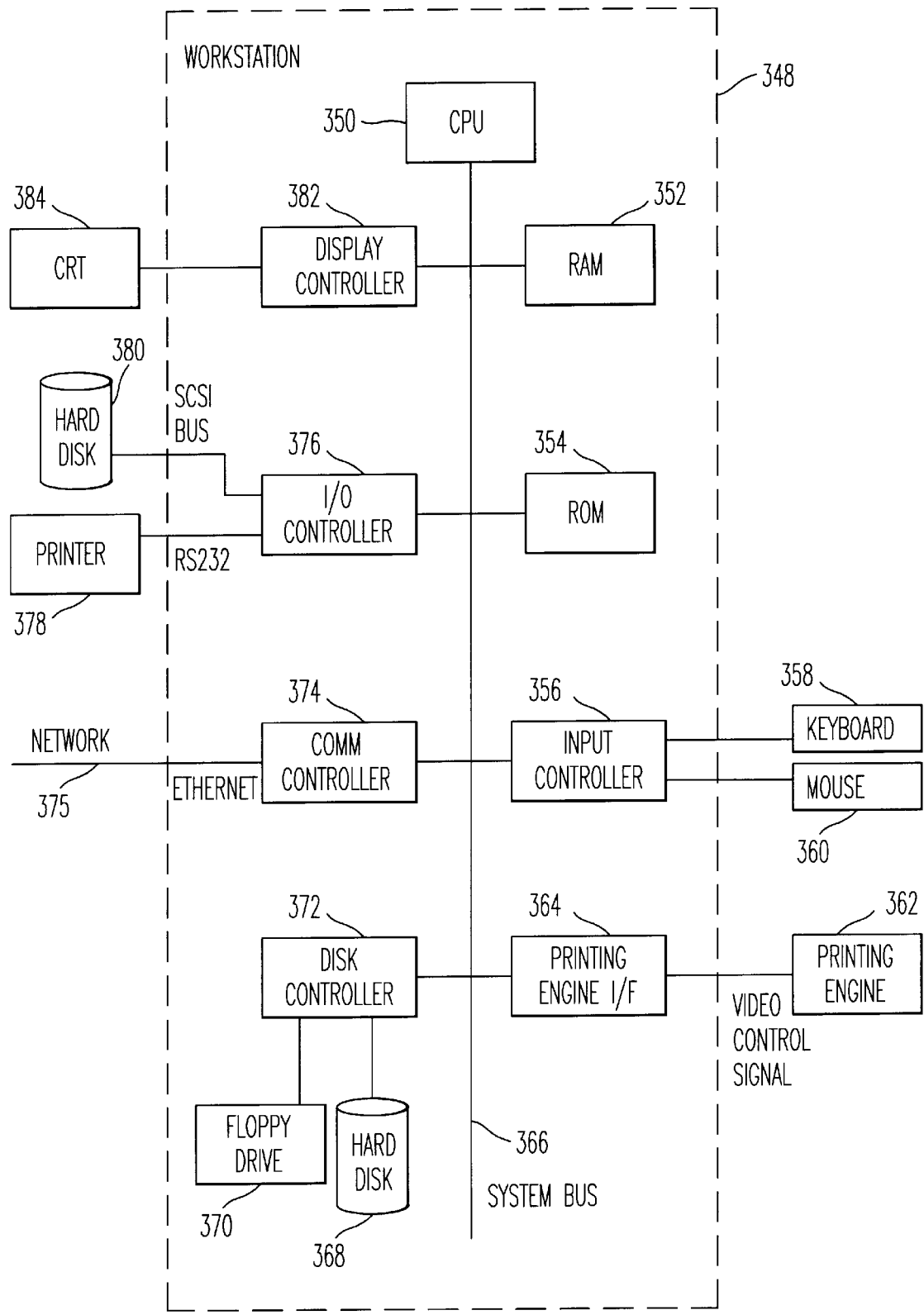
FIG. 14 illustrates a hardware embodiment of the invention.

In FIG. 13 which illustrates the hierarchy processor, step 330 determines if a higher hierarchical level in the document is to be processed. As illustrated in FIG. 6, a higher hierarchical level is closer to the top of the figure. When a higher hierarchical level is not to be translated, meaning the process proceeds deeper into the hierarchy, flow proceeds to step 332 which determined the new hierarchical level (if any) which is to be used. As an example, for the tag <DEVTYPE> contained at line 5 of FIG. 2, the tag indicates the hierarchical level is to be changed and the data which follows, "Scanner", indicates that the hierarchical level is for the scanner. The key information is searched to find a key corresponding to the scanner. Once the key is located, the data structures are searched to find a data structure having the corresponding key. A similar process is also performed where the tag alone indicates the key information which is to be searched. It is possible that the tag does not indicate that a new hierarchical level exists. Subsequently, the new key or an indication of no key change is returned.

If step 320 determines that the new data structure used for keeping track of translation information or resources including dictionaries and rules is to go higher in the hierarchy, step 334 determines the number of hierarchical levels to go up using the tag and document hierarchy information. Subsequently, the number of levels to go up within the hierarchy is returned. It is also possible that when the start tag is encountered with its corresponding end tag omitted, the system first executes steps 330 and 334 to go up in the hierarchy and then executes steps 330 and 332 to go down the hierarchy. The process of FIGS. 12 and 13 then ends.

The present invention operates on a general purpose computer programmed according to the teachings of the present invention or using another type of machine such as a special purpose computer. A computer embodying the present invention, is a workstation such as a workstation 348. The workstation 348 includes a CPU 350, a RAM 352, a ROM 354 for storing program information, and an input controller 356 connected to a keyboard 358 and a mouse 360. Further, there is a printing engine interface 364 which controls a printing engine 362 such as a printer using video control signals. A system bus 366 connects the various elements contained within the workstation 348. There is a disk controller 372 connected to a floppy drive 370 and a hard disk drive 368. A communication controller 370 is connected to a network 375 which may be an Ethernet network. An I/O controller 376 is connected to a hard disk drive 380 such as an external hard disk drive through a SCSI bus. Also connected to the I/O controller 376 is a printer 378 which is connected through a RS-232 connection or alternatively a parallel connection. The workstation also includes a display controller 382 which is connected to a CRT 384 or other display device.

Figure 15:
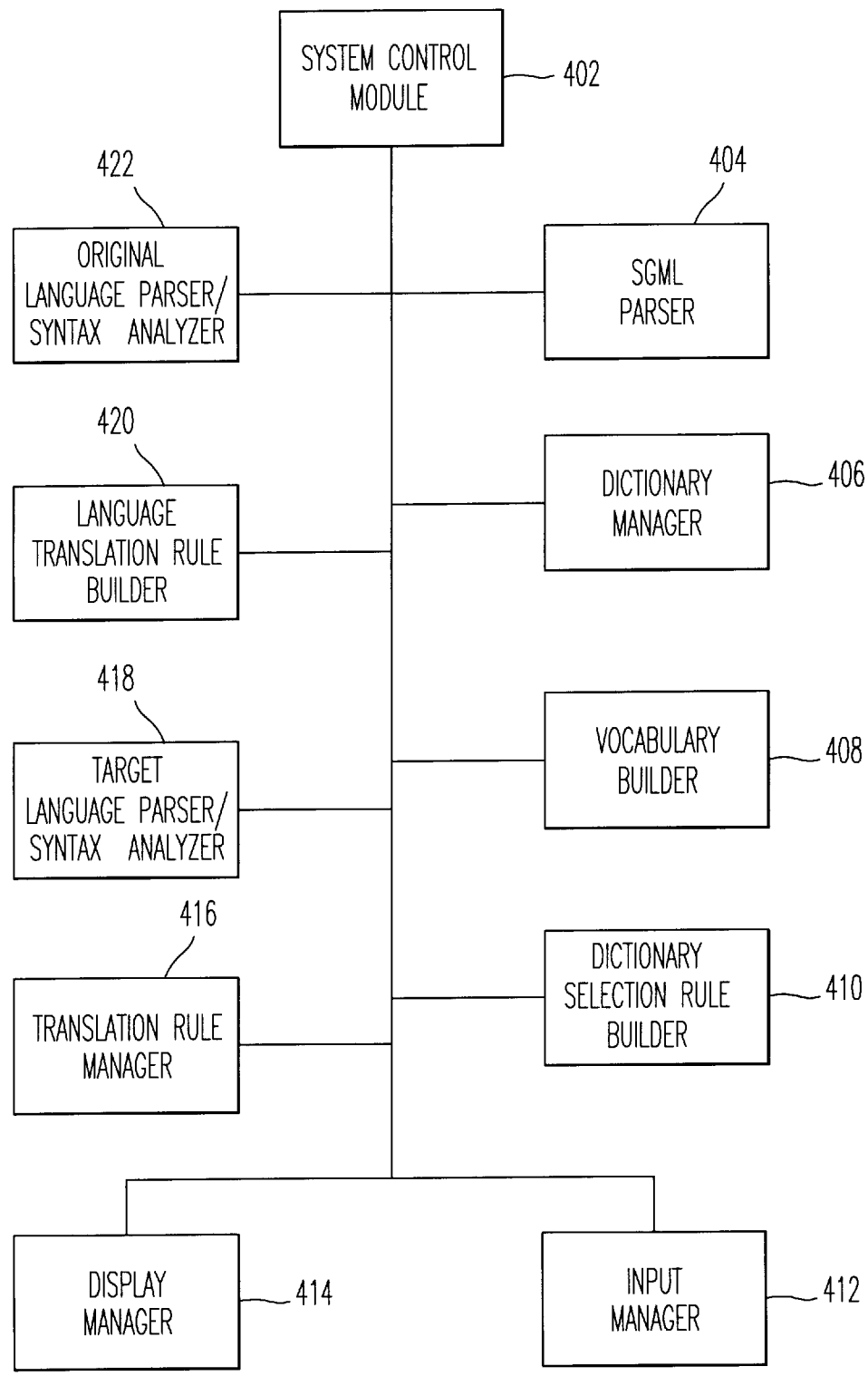
FIG. 15 illustrates a conceptual block diagram of the software components of the invention.

FIG. 15 illustrates the software components utilized by the present invention. A system control module 402 is used to control the operation and intercommunication of each of the software components. An SGML parser is used to parse the original document. In addition to the SGML parser 404, there is also an original language parser/syntax analyzer 422 and a target language parser/syntax analyzer 418. A dictionary manager 406 manages multiple dictionaries used by the invention and similarly, the translation rule manager manages the various translation rule data bases which are utilized by the invention. The management performed by these managers also includes monitoring the correspondence between syntax and semantics associated with the DTD. A vocabulary builder 408 builds the vocabulary of pairs of words from the original and target languages. The target language part of this pair may be a linked list to handle multiple words associated with a single original word. Each dictionary may be constructed to include a pointer to the pairs because different dictionaries may share the same words. The dictionary selection rule builder 410 and the language translation rule builder 420 construct the rules used to perform the translations in accordance with the processes described herein. An input manager 412 and a display manager 414 process interactions with a user.

Figure 16:
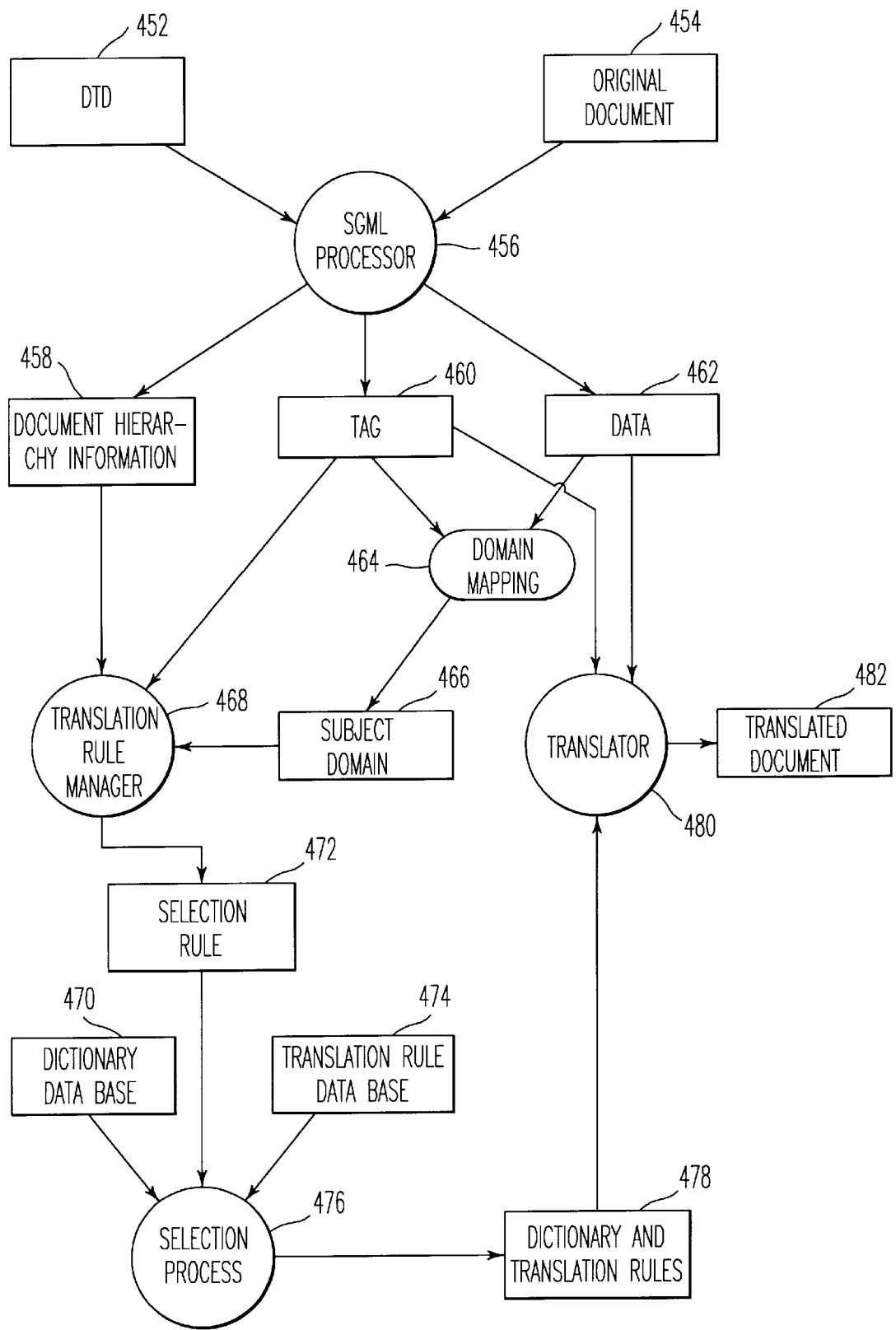
FIG. 16 illustrates a more detailed data flow diagram of the operation of the invention.

FIG. 16 illustrates another data flow diagram of the invention which is used during the automatic translation process. In this diagram, the SGML processor 456 reads the original document 454 along with the DTD 452 and generates document hierarchy information 458, and separates the tags 460 and the data 462 of the original document 454. A domain mapping process 464 reads the tags and data and generates a subject domain 466. The subject domain indicates, for example, whether the subject matter of the document being translated is for a scanner, a printer, or a technical document, for a user manual, or other subject domains. The domains may also be more narrow, if desired. The translation rule manager 468 utilizes the document hierarchy information 458, the tags 460, the subject domain 466, and the data 462, if desired in order to generate a selection rule(s) 472 which indicates the specific dictionary and translation rules which are to be utilized. A selection process 476 receives the selection rule 472 and selects the appropriate dictionary information and translation rule information from the dictionary data base 470 and the translation rule data base 474 in order to generate (or copy or utilize) the dictionary and translation rules which are utilized by the translator 480. The translator 480 reads the tags 460 of the document, the data 462 of the document, and the dictionary and translation rules 478 which have been selected in order to generate the translated document 482 in accordance with the process of the present invention.

After the invention is properly trained and operating to perform the translation operation, the input original language document can be analyzed using the dictionary data base and translation rules so that unclear inputs are questioned. For example, if the automatic translation system has difficulty in translating a document, a message can be displayed indicating that the original language document may have some errors. There are many Japanese who generate Japanese language documents which are difficult to translate. A reason for this difficulty is that the meaning in Japanese itself is not clear. If the meaning in the original language is not clear, it will be difficult or impossible to use a machine to generate a clear translation. By analyzing the input document, the originator of the document or other person can be informed of the problem and/or requested to make the original document more clear.

This invention may be conveniently implemented using a conventional general purpose digital computer or microprocessor programmed according to the teachings of the present specification, as will be apparent to those skilled in the computer art. Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The invention has been described as using tags to indicate the different sections of the document which use different translation resources. However, as computers become more powerful and software becomes more sophisticated, is it possible that instead of using tags to mark different sections of a document, it will be possible for the different sections of documents or different types of documents to be automatically determined based on content contained therein. For example, words or phrases contained within the document may be analyzed in order to determine a type of section which is contained within the source document.

The present invention includes a computer program product which is a storage medium including instructions which can be used to program a computer to perform a process of the invention. The storage medium can include, but is not limited to, any type of disk including floppy disks, optical discs, CD-ROMs, and magneto-optical disks, ROMs, RAMs, EPROMs, EEPROMs, magnetic or optical cards, or any type of media suitable for storing electronic instructions.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent in the United States is:

1. A computer implemented method of translating a document from a first language to a second language, comprising the steps of:
    inputting a document which is in a first language;
    analyzing at least one tag contained within the document and producing an analysis result;
    selecting a translation resource in accordance with the analysis result which is used for translating the document; and
    translating the document from the first language to a second language using the translation resource which has been selected.

2. A method according to claim 1, wherein:
    the step of selecting the translation resource comprises selecting a first translation resource for a first part of a document and selecting a second translation resource for a second part of the document; and
    the step of translating comprises translating the first part of the document using the first translation resource and translating the second part of the document using the second translation resource.

3. A method according to claim 1, wherein:
    the step of analyzing comprises analyzing structural information contained within the document.

4. A method according to claim 1, wherein:
    the step of analyzing comprises analyzing Standard Generalized Markup Language tags contained within the document.

5. A method according to claim 1, wherein:
    the step of selecting the translation resource comprises selecting dictionary information which is used for translating the document.

6. A method according to claim 1, wherein:
    the step of selecting the translation resource comprises selecting rule information which is used for translating the document.

7. A method according to claim 1, wherein:
    the step of selecting the translation resource comprises selecting dictionary information and rule information which is used for translating the document.

8. A method according to claim 1, wherein:
    the step of selecting comprises selecting a data structure which defines a location of the translation resource used for translating the document.

9. A method according to claim 1, wherein:
    the step of analyzing produces an analysis result which includes a key which indicates the data structure which defines a location of the translation resource used for translating; and
    the step of selecting comprises selecting the data structure containing the key which defines a location of the translation resource used for translating the document.

10. A method according to claim 1, further comprising the step of:
    simultaneously displaying a section of the document which is in the first language and a corresponding section of the document which has been translated to the second language.

11. A method according to claim 10, further comprising the step of:
    changing the section of the document which has been translated to the second language, after the step of displaying.

12. A system for translating a document from a first language to a second language, comprising:
    means for analyzing at least one tag contained within the document and producing an analysis result;
    means for selecting a translation resource in accordance with the analysis result which is used for translating the document; and
    means for translating the document from the first language to a second language using the translation resource which has been selected.

13. A system according to claim 12, wherein:
    the means for selecting the translation resource comprises means for selecting a first translation resource for a first part of a document and selecting a second translation resource for a second part of the document; and
    the means for translating comprises means for translating the first part of the document using the first translation resource and means for translating the second part of the document using the second translation resource.

14. A system according to claim 12, wherein:
the means for analyzing comprises means for analyzing structural information contained within the document.

15. A system according to claim 13, wherein:
the means for analyzing comprises means for analyzing Standard Generalized Markup Language tags contained within the document.

16. A system according to claim 12, wherein:
the means for selecting the translation resource comprises means for selecting dictionary information which is used for translating the document.

17. A system according to claim 12, wherein:
the means for selecting the translation resource comprises means for selecting rule information which is used for translating the document.

18. A system according to claim 12, wherein:
the means for selecting the translation resource comprises means for selecting dictionary information and rule information which is used for translating the document.

19. A system according to claim 12, wherein:
the means for selecting comprises means for selecting a data structure which defines a location of the translation resource used for translating the document.

20. A system according to claim 12, wherein:
the means for analyzing produces an analysis result which includes a key which indicates the data structure which defines a location of the translation resource used for translating; and
the means for selecting comprises means for selecting the data structure containing the key which defines a location of the translation resource used for translating the document.

21. A system according to claim 12, further comprising:
means for simultaneously displaying a section of the document which is in the first language and a corresponding section of the document which has been translated to the second language.

22. A system according to claim 21, further comprising:
means for changing the section of the document which has been translated to the second language.

23. A computer program product having a computer readable medium having computer program logic recorded thereon for translating a document from a first language to a second language, comprising:
means for analyzing at least one tag contained within the document and producing an analysis result;
means for selecting a translation resource in accordance with the analysis result which is used for translating the document; and
means for translating the document from the first language to a second language using the translation resource which has been selected.

24. A computer program product according to claim 23, wherein:
the means for selecting the translation resource comprises means for selecting a first translation resource for a first part of a document and selecting a second translation resource for a second part of the document; and
the means for translating comprises means for translating the first part of the document using the first translation resource and means for translating the second part of the document using the second translation resource.

25. A computer program product according to claim 23, wherein:
the means for analyzing comprises means for analyzing structural information contained within the document.

26. A computer program product according to claim 23, wherein:
the means for analyzing comprises means for analyzing Standard Generalized Markup Language tags contained within the document.

* * * * *